United States Patent
Ke et al.

(10) Patent No.: US 12,488,739 B2
(45) Date of Patent: Dec. 2, 2025

(54) SHIFT REGISTER CIRCUIT APPLIED IN A SHIFT REGISTER FOR DISPLAY, SHIFT REGISTER, DISPLAY PANEL AND DISPLAY DEVICE

(71) Applicant: Xiamen Tianma Display Technology Co., Ltd., Xiamen (CN)

(72) Inventors: Zhoulin Ke, Xiamen (CN); Cheng Hu, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/795,851

(22) Filed: Aug. 6, 2024

(65) Prior Publication Data

US 2024/0395195 A1   Nov. 28, 2024

(30) Foreign Application Priority Data

Aug. 7, 2023 (CN) .......................... 202310986476.6

(51) Int. Cl.
*G09G 3/3266* (2016.01)
*G09G 3/32* (2016.01)
*G11C 19/28* (2006.01)
*G09G 3/20* (2006.01)
*G09G 3/36* (2006.01)

(52) U.S. Cl.
CPC ............... *G09G 3/32* (2013.01); *G11C 19/28* (2013.01); *G09G 3/20* (2013.01); *G09G 3/3266* (2013.01); *G09G 3/3648* (2013.01); *G09G 3/3677* (2013.01); *G09G 2310/0286* (2013.01); *G09G 2310/08* (2013.01)

(58) Field of Classification Search
CPC .......... G09G 3/20; G09G 3/32; G09G 3/3266; G09G 3/3648; G09G 3/3677; G09G 2310/0286; G09G 2310/08; G11C 19/28
See application file for complete search history.

(56) References Cited

U.S. PATENT DOCUMENTS

| | | | |
|---|---|---|---|
| 2018/0075800 A1* | 3/2018 | Ma | G09G 3/3266 |
| 2018/0174503 A1* | 6/2018 | Shim | G09G 3/3266 |
| 2022/0392403 A1* | 12/2022 | Yamamoto | G09G 3/3266 |
| 2024/0371329 A1* | 11/2024 | Liu | G09G 3/3266 |

* cited by examiner

Primary Examiner — Adam J Snyder
(74) Attorney, Agent, or Firm — KDW FIRM PLLC

(57) ABSTRACT

A shift register circuit includes a first control module for controlling the potential of a first node in response to an input signal and a clock signal; a first output module for controlling the transmission path of a first level signal to a signal output terminal in response to the potential of the first node; a second control module for controlling a second level signal to be transmitted to a second node when the first level signal is transmitted to the signal output terminal and control the first level signal to be transmitted to the second node when the first level signal stops being transmitted to the signal output terminal; and a second output module for controlling the transmission path of the second level signal to the signal output terminal in response to the potential of the second node.

19 Claims, 22 Drawing Sheets

SHIFT REGISTER CIRCUIT APPLIED IN A SHIFT REGISTER FOR DISPLAY, SHIFT REGISTER, DISPLAY PANEL AND DISPLAY DEVICE

CROSS-REFERENCE TO RELATED APPLICATION

This application claims priority to Chinese Patent Application No. 202310986476.6, filed on Aug. 7, 2023, the disclosure of which is incorporated herein by reference in its entirety.

TECHNICAL FIELD

The present application relates to the field of display technologies and, in particular, to a shift register circuit, a shift register, a display panel and a display device.

BACKGROUND

With the development of display technologies, a display panel is becoming more and more integrated, and the gate driver on array technology has emerged so that a gate driving circuit for scanning a pixel array in the display panel row by row can be integrated into the display panel, thereby saving materials, reducing process steps and lowering costs.

The gate driving circuit for scanning the pixel array row by row is also referred to as a shift register circuit. In the related art, a shift register circuit has a relatively complex structure and connection relation, resulting in a relatively large size of the shift register circuit. Generally, the shift register circuit is disposed in a non-display region of the display panel so that a relatively large size of a non-display region is required for disposing the shift register circuit, thereby being not conducive to the narrow bezel of the display panel. Meanwhile, subject to the structure and connection relation of the shift register circuit in the related art, a gate drive signal output by the shift register circuit in the related art is unstable so that the stability of display light emission of the pixel array is affected, thereby affecting the display effect of the display panel.

SUMMARY

The present application provides a shift register circuit, a shift register, a display panel and a display device to simplify the structure of the shift register circuit, reduce the size of the shift register circuit and improve the accuracy of a signal output by the shift register circuit so that the narrow bezel of the display panel can be facilitated and the display effect of the display panel can be improved.

According to an aspect of the present application, a shift register circuit is provided and includes a first control module, a first output module, a second control module and a second output module.

The first control module is electrically connected to a signal input terminal, a clock signal terminal and a first node separately and is configured to control a potential of the first node in response to an input signal of the signal input terminal and a clock signal of the clock signal terminal.

The first output module is electrically connected to the first node, a first level terminal and a signal output terminal separately and is configured to control a transmission path of a first level signal of the first level terminal to the signal output terminal in response to the potential of the first node.

The second control module is electrically connected to the first level terminal, a second level terminal, the first node and a second node separately and is configured to control a second level signal of the second level terminal to be transmitted to the second node when the first level signal of the first level terminal is transmitted to the signal output terminal and control the first level signal of the first level terminal to be transmitted to the second node when the first level signal of the first level terminal stops being transmitted to the signal output terminal.

The second output module is electrically connected to the second node, the second level terminal and the signal output terminal separately and is configured to control a transmission path of the second level signal of the second level terminal to the signal output terminal in response to a potential of the second node.

According to another aspect of the present application, a shift register including a plurality of preceding shift register circuits arranged in a cascade manner is provided.

Among the plurality of shift register circuits, a signal output terminal of a previous-stage shift register circuit is electrically connected to a signal input terminal of a subsequent-stage shift register circuit, and a signal input terminal of a first-stage shift register circuit receives a start signal.

A clock signal of a clock signal terminal of an odd number-stage shift register circuit is denoted as a first clock signal, and a clock signal of a clock signal terminal of an even number-stage shift register circuit is denoted as a second clock signal.

The first clock signal and the second clock signal have a same clock cycle, and in one clock cycle, an effective pulse of the first clock signal and an effective pulse of the second clock signal are sequentially shifted.

According to another aspect of the present application, a display panel is provided and includes the preceding shift register. According to another aspect of the present application, a display device is provided and includes the preceding display panel.

It is to be understood that the content described in this section is neither intended to identify key or critical features of embodiments of the present application nor intended to limit the scope of the present application. Other features of the present application become easily understood through the description hereinafter.

BRIEF DESCRIPTION OF DRAWINGS

To illustrate the technical solutions in embodiments of the present application more clearly, drawings used in the description of the embodiments are briefly described below. Apparently, the drawings described below only illustrate part of the embodiments of the present application, and those of ordinary skill in the art may obtain other drawings based on the drawings on the premise that no creative work is done.

DETAILED DESCRIPTION

Figure 1:
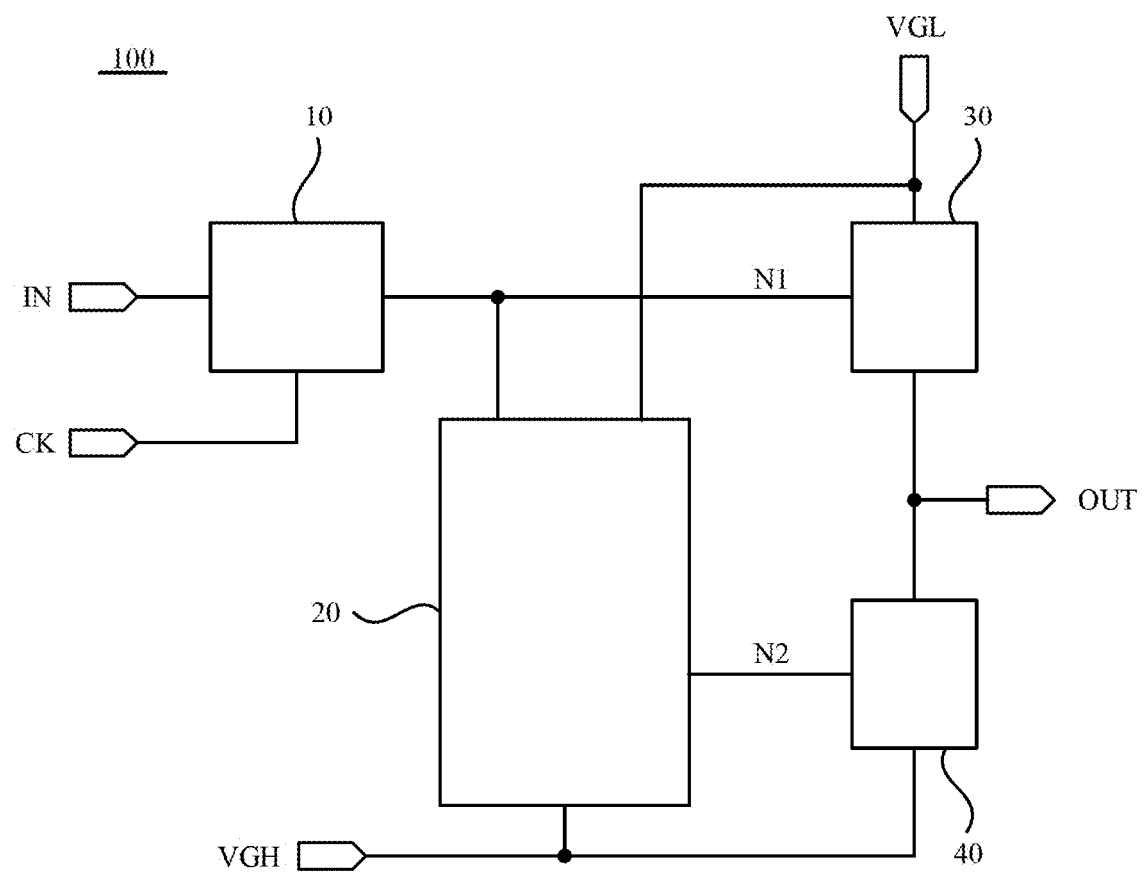
FIG. 1 is a diagram illustrating the structure of a shift register circuit according to embodiments of the present application.

The technical solutions in embodiments of the present application are described clearly and completely in conjunction with drawings in the embodiments of the present application from which the solutions of the present application are better understood by those skilled in the art. Apparently, the embodiments described below are part, not all, of the embodiments of the present application. Based on the embodiments of the present application, all other embodiments obtained by those of ordinary skill in the art on the premise that no creative work is done are within the scope of the present application.

It is to be noted that terms such as "first" and "second" in the description, claims and drawings of the present application are used for distinguishing between similar objects and are not necessarily used for describing a particular order or sequence. It is to be understood that the data used in this manner are interchangeable in appropriate cases so that the embodiments of the present application described herein can be implemented in an order not illustrated or described herein. In addition, the terms "including", "having" and variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, product, or device.

In the related art, the first node for controlling a low-level gate drive signal to output is controlled by the first control module, the second node for controlling a high-level gate drive signal to output is controlled by the second control module, and the first control module controls the potential of the first node under the control of a respective clock signal and a respective input signal, and the second control module also controls the potential of the second node under the control of a respective clock signal so that the first control module and the second control module can be independent from each other. If the signal controlling the first control module and/or the second control module fluctuates, the case in which the first node and the second node are simultaneously at an enable level may occur, resulting in a path formed between a high-level signal and a low-level signal and affecting the accuracy and stability of the output gate drive signal. Meanwhile, the presence of a relatively large current after the path is formed between the high-level signal and the low-level signal may damage a component for transmitting a signal, not facilitating the output stability of the shift register circuit, thereby affecting the display effect of the display panel using the shift register circuit to scan the pixel array row by row. An interlocking module is disposed in the shift register circuit so that the interlocking module can control the potential of the second node according to the potential of the first node and control the potential of the first node according to the potential of the second node, avoiding the case in which the first node and the second node are simultaneously at an enable level. However, the addition of the interlocking module and corresponding connection relations enables the structure and connection relation of the shift register circuit to be relatively complex and the size of the shift register circuit to be relatively large. When the shift register circuit is disposed in the non-display region of the display panel, the narrow bezel and high screen-to-body ratio of the display panel are not facilitated.

To solve the preceding technical problems, embodiments of the present application provide a shift register circuit. The shift register circuit includes a first control module, a first output module, a second control module and a second output module.

The first control module is electrically connected to a signal input terminal, a clock signal terminal and a first node separately and is configured to control the potential of the first node in response to an input signal of the signal input terminal and a clock signal of the clock signal terminal.

The first output module is electrically connected to the first node, a first level terminal and a signal output terminal separately and is configured to control a transmission path of a first level signal of the first level terminal to the signal output terminal in response to the potential of the first node.

The second control module is electrically connected to the first level terminal, a second level terminal, the first node and a second node separately and is configured to control a second level signal of the second level terminal to be transmitted to the second node when the first level signal of the first level terminal is transmitted to the signal output terminal and control the first level signal of the first level terminal to be transmitted to the second node when the first level signal of the first level terminal stops being transmitted to the signal output terminal.

The second output module is electrically connected to the second node, the second level terminal and the signal output terminal separately and is configured to control a transmission path of the second level signal of the second level terminal to the signal output terminal in response to the potential of the second node.

With the technical solutions adopted, the first control module is only electrically connected to the clock signal, the input signal and the first node so that the first control module can have a relatively simple connection structure; and the control of a low level and a high level of the potential of the first node can be implemented without relative many control signals so that the shift register circuit can have a relatively simple structure, and the size of the shift register circuit can be reduced. Meanwhile, the second control module transmits the first level signal or the second level signal under the control of the potential of the first node so that the potential of the second node can be switched between the first level signal and the second level signal, and so that the second control module can enable the potential of the second node to be switched between a high level and a low level without electrical connection to other pulse signal terminals, thereby conducive to reducing the number of pulse signals supplied to the shift register circuit, simplifying the connection structure of the shift register circuit and further reducing the size of the shift register circuit. Since the potential of the first node directly controls a signal transmitted by the second control module to control the potential of the second node, that is, the potential of the first node can directly control the potential of the second node, there is no need to dispose an additional interlocking module so that the structure of the shift register circuit can be further simplified, and the size of the shift register circuit can be reduced. In this way, when the shift register circuit having a relatively small size is applied to the display panel, the narrow bezel and a high screen-to-body ratio of the display panel can be facilitated. In addition, the potential of the first node directly controls the potential of the second node, that is, the potential of the first node can clamp the potential of the second node, so that the first output module controlled by the potential of the first node and the second output module controlled by the potential of the second node can be turned on in a time-sharing manner to prevent the accuracy of the signal output by the signal output terminal from being affected and even components in the first output module and the second output module from being damaged due to a path formed between the first level terminal electrically connected to the first output module and the second level terminal electrically connected to the second output module, where the path is caused by the simultaneous turn-on or turn-off of the first output module and the second output module. In this way, when the shift register circuit is configured to scan the pixel array in the display panel row by row, the display effect of the display panel can be improved.

The preceding is the core idea of the present application. Based on the embodiments of the present application, all other embodiments obtained by those of ordinary skill in the art on the premise that no creative work is done are within the scope of the present application. Technical solutions in embodiments of the present application are described clearly and completely hereinafter in conjunction with the drawings in the embodiments of the present application.

FIG. 1 is a diagram illustrating the structure of a shift register circuit according to embodiments of the present application. As shown in FIG. 1, the shift register circuit 100 includes a first control module 10, a second control module 20, a first output module 30 and a second output module 40. The first control module 10 is electrically connected to a signal input terminal IN, a clock signal terminal CK and a first node N1 separately and can control the potential VN1 of the first node N1 in response to an input signal Vin of the signal input terminal IN and a clock signal ck of the clock signal terminal CK. The first output module 30 is electrically connected to the first node N1, a first level terminal VGL and a signal output terminal OUT separately and is configured to control a transmission path of a first level signal Vgl of the first level terminal VGL to the signal output terminal OUT in response to the potential of the first node N1. The second control module 20 is electrically connected to the first level terminal VGL, a second level terminal VGH, the first node N1 and a second node N2 separately and is configured to control a second level signal Vgh of the second level terminal VGH to be transmitted to the second node N2 when the first level signal Vgl of the first level terminal VGL is transmitted to the signal output terminal OUT and control the first level signal Vgl of the first level terminal VGL to be transmitted to the second node N2 when the first level signal Vgl of the first level terminal VGL stops being transmitted to the signal output terminal OUT. The second output module 40 is electrically connected to the second node N2, the second level terminal VGH and the signal output terminal OUT separately and is configured to control a transmission path of the second level signal Vgh of the second level terminal VGH to the signal output terminal OUT in response to the potential of the second node N2.

The clock signal ck of the clock signal terminal CK may be a pulse signal including a high level and a low level. The input signal Vin of the signal input terminal IN may also include a high level and a low level. The first level signal Vgl of the first level terminal VGL and the second level signal Vgh of the second level terminal VGH may be each a fixed level signal and are different signals. That is, when the first level signal Vgl is a low-level signal, the second level signal Vgh may be a high-level signal, and vice versa.

It is to be understood that the high level and the low level mentioned in the preceding are relative concepts, that is, the amplitude of the high level may be greater than the amplitude of the low level, the amplitudes of the high level and the low level may be positive, or the amplitudes of the high level and the low level may also be negative, or the amplitude of the high level is positive, and the amplitude of the low level is negative. The amplitudes and polarities of the high level and the low level are not specifically limited in the embodiments of the present application on the premise that the core inventive point of the embodiments of the present application can be implemented. For ease of description, unless otherwise specified, the technical solutions of the embodiments of the present application are illustrated using an example in which the first level signal Vgl is a low-level signal, and the second level signal Vgh is a high-level signal in the embodiments of the present application.

In an embodiment, the first control module 10 is electrically connected to the clock signal terminal CK, the signal input terminal IN and the first node N1 separately so that the first control module 10 can be turned on or off under the control of the clock signal ck of the clock signal terminal CK to control the transmission path of the input signal Vin of the signal input terminal IN to the first node N1. For example, when the clock signal ck of the clock signal terminal CK controls the first control module 10 to be in an on state, the first control module 10 may transmit the input signal Vin of the signal input terminal IN to the first node N1 so that a signal of the first node N1 can be consistent with the input signal Vin at the current moment; and when the clock signal ck of the clock signal terminal CK controls the first control module 10 to be in an off state, the first control module 10 stops transmitting the input signal Vin of the signal input terminal IN to the first node N1 so that the potential VN1 of the first node N1 can remain unchanged. In this case, if the first node N1 needs a low-level signal, when the input signal Vin of the signal input terminal IN is at a low level, the clock signal ck of the clock signal terminal CK controls the first control module 10 to be turned on so that the low-level signal can be transmitted to the first node N1. Conversely, when the first node N1 needs a high-level signal, the first control module 10 may be controlled to be turned on when the input signal Vin is at a high level so that the high-level signal can be transmitted to the first node N1. In this way, the potential VN1 of the first node N1 can be controlled according to needs.

The first output module 30 is electrically connected to the first level terminal VGL, the first node N1 and the signal output terminal OUT separately so that the first output module 30 can be turned on or off under the control of the potential VN1 of the first node N1. When the potential VN1 of the first node N1 controls the first output module 30 to be turned on, the first output module 30 can transmit the first level signal Vgl of the first level terminal VGL to the signal output terminal OUT so that a signal output by the signal output terminal OUT can be consistent with the first level signal Vgl. When the potential VN1 of the first node N1 controls the first output module 30 to be turned off, the first output module 30 stops transmitting the first level signal Vgl of the first level terminal VGL to the signal output terminal OUT, and in this case, the signal of the signal output terminal OUT may be controlled by a signal transmitted by the second output module 40.

The second control module 20 is electrically connected to the first node N1, the first level terminal VGL, the second level terminal VGH and the second node N2 separately so that the first control module 20 can transmit the first level signal Vgl of the first level terminal VGL or the second level signal Vgh of the second level terminal VGH to the second node N2 under the control of the potential VN1 of the first node N1; when controlling the first input module 30 to be turned off, the potential VN1 of the first node N1 may control the second control module 20 to transmit the first level signal Vgl of the first level terminal VGL to the second node N2; and when controlling the first input module 30 to be turned on, the potential VN1 of the first node N1 may control the second control module 20 to transmit the second level signal Vgh of the second level terminal VGH to the second node N2 so that the potential VN2 of the second node N2 can be controlled by the potential of the first node N1.

The second output module 40 is electrically connected to the second node N2, the second level terminal VGH and the signal output terminal separately so that the second output module 40 can be turned on or off under the control of the potential VN2 of the second node N2. When the potential VN2 of the second node N2 controls the second output module 40 to be turned on, the second output module 40 can transmit the second level signal Vgh of the second level terminal VGH to the signal output terminal OUT so that a signal output by the signal output terminal OUT can be consistent with the second level signal Vgh. When the potential VN2 of the second node N2 controls the second output module 40 to be turned off, the second output module 40 stops transmitting the second level signal Vgh of the second level terminal VGH to the signal output terminal OUT, and in this case, the signal of the signal output terminal OUT may be controlled by a signal transmitted by the first output module 30. To prevent the first output module 30 and the second output module 40 from being simultaneously turned on and ensure the accuracy of the gate drive signal output by the signal output terminal OUT, the second level signal Vgh transmitted to the second node N2 may be a signal controlling the second output module 40 to be turned off, and the first level signal Vgl transmitted to the second node N2 may be a signal controlling the second output module 40 to be turned on.

In this embodiment, the first control module 10 is only electrically connected to the clock signal ck, the input signal Vin and the first node N1 so that the first control module 10 can have a relatively simple connection structure; and the control of a low level and a high level of the potential VN1 of the first node N1 can be implemented without more control signals so that the shift register circuit 100 can have a relatively simple structure, and the size of the shift register circuit 100 can be reduced. Meanwhile, the first control module 10, the clock signal ck and the input signal Vin control the potential of the first node N1 so that the potential VN1 of the first node N1 can be switched between a high level and a high level according to actual needs to enable the potential VN1 of the first node N1 to control the first output module 30 to be turned on or off; the second control module 20 is controlled by the potential VN1 of the first node N1 and transmits the first level signal Vgl or the second level signal Vgh under the control of the potential VN1 of the first node N1 so that the potential VN2 of the second node N2 can be switched between the first level signal Vgl and the second level signal Vgh to control the second output module 40 to be turned on or off; in this way, the second control module 20 can enable the potential VN2 of the second node N2 to be switched between a high level and a low level without electrical connection to other pulse signal terminals, thereby reducing the number of pulse signals supplied to the shift register circuit 100, simplifying the connection structure of the shift register circuit 100 and further reducing the size of the shift register circuit 100. Since the potential VN1 of the first node N1 directly controls the signal transmitted by the second control module 20 to control the potential VN2 of the second node N2, that is, the potential VN1 of the first node N1 can directly control the potential VN2 of the second node N2, there is no need to dispose an additional interlocking module so that the structure of the shift register circuit 100 can be further simplified, and the size of the shift register circuit 100 can be reduced. In this way, when the shift register circuit 100 having a relatively small size is applied to the display panel, the narrow bezel and high screen-to-body ratio of the display panel can be facilitated.

In addition, the potential VN1 of the first node N1 directly controls the potential VN2 of the second node N2, that is, the potential VN1 of the first node N1 can clamp the potential VN2 of the second node N2, so that the potential VN2 of the second node N2 can control the second output module 40 to be turned off when the potential VN1 of the first node N1 controls the first output module 30 to be turned on, and the potential VN2 of the second node N2 can control the second output module 40 to be turned on when the potential VN1 of the first node N1 controls the first output module 30 to be turned off, so as to prevent the accuracy of the signal output by the signal output terminal OUT from being affected and even components in the first output module 30 and the second output module 40 from being damaged due to a path which is formed between the first level terminal VGL electrically connected to the first output module 30 and the second level terminal VGH electrically connected to the second output module 40 and caused by the simultaneous turn-on or turn-off of the first output module 30 and the second output module 40. That is, the potential VN1 of the first node N1 controls the potential VN2 of the second node N2 so that the components in the first output module 30 and the second output module 40 can be prevented from being damaged, and the accuracy and stability of the gate drive signal Gout output by the signal output terminal OUT can be ensured. In this way, when the shift register circuit 100 is used for scanning the pixel array in the display panel row by row, the display effect of the display panel can be improved.

A pixel in the pixel array in the display panel may include components such as a transistor. The gate drive signal output by the shift register circuit 100 may control the transistor in the pixel to be turned on or off so that the gate drive signal output by the shift register circuit can include an effective level and an ineffective level. That is, when being at an effective level, the gate drive signal may control the transistor to be turned on, and when being at an ineffective level, the gate drive signal may control the transistor to be turned off. In this case, one of the first level signal transmitted by the first output module and the second level signal transmitted by the second output module serves as the effective level of the gate drive signal while the other one of the first level signal transmitted by the first output module and the second level signal transmitted by the second output module serves as the ineffective level of the gate drive signal. This is not specifically limited in the embodiments of the present application on the premise that the core inventive point of the embodiments of the present application can be implemented.

It is to be understood that the preceding description of the operation principles of the first control module, the second control module, the first output module and the second output module in the shift register circuit are merely exemplary illustrations of the embodiments of the present application. The operation principle of each module is related to its structure, which may be designed according to actual needs and is not specifically limited in embodiments of the present application. The structure of each module in the shift register circuit provided by the embodiments of the present application is described hereinafter in conjunction with typical examples.

Figure 2:
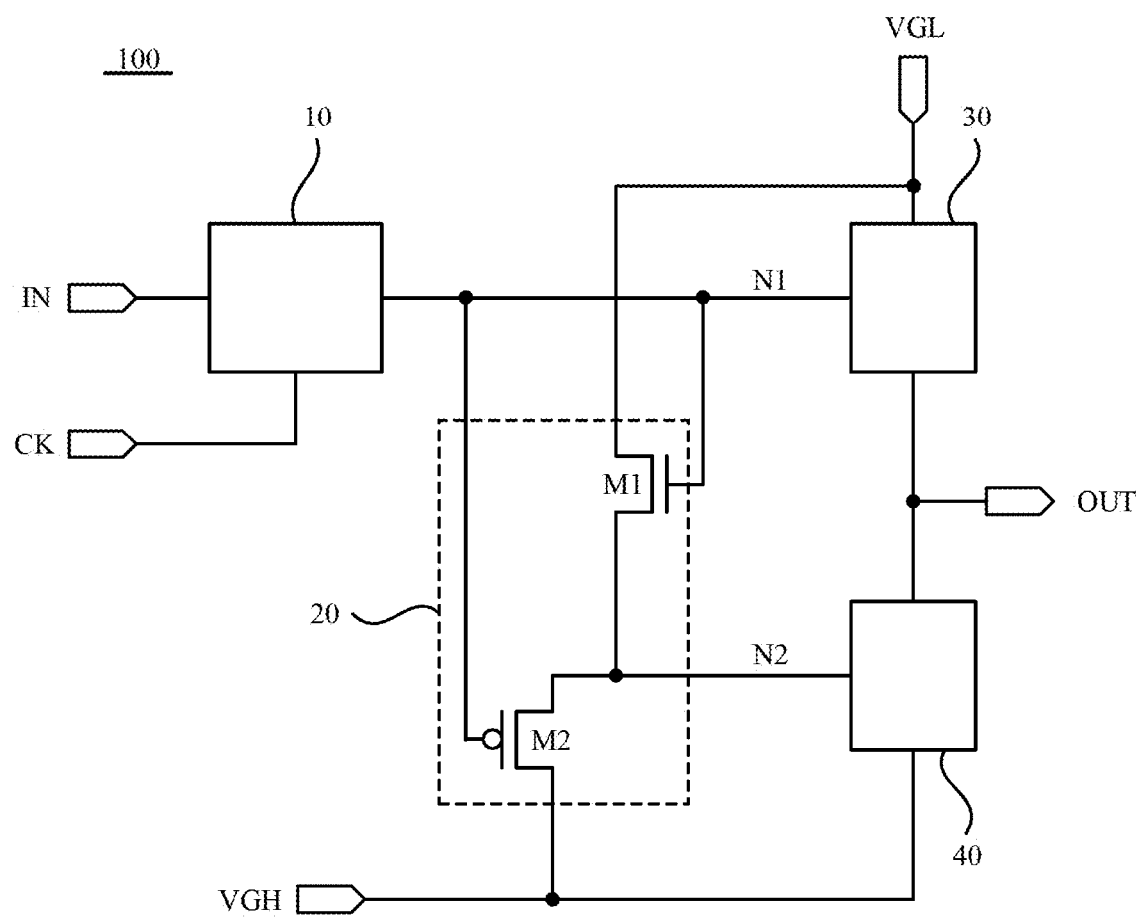
FIG. 2 is a diagram illustrating the structure of another shift register circuit according to embodiments of the present application.
Figure 3:
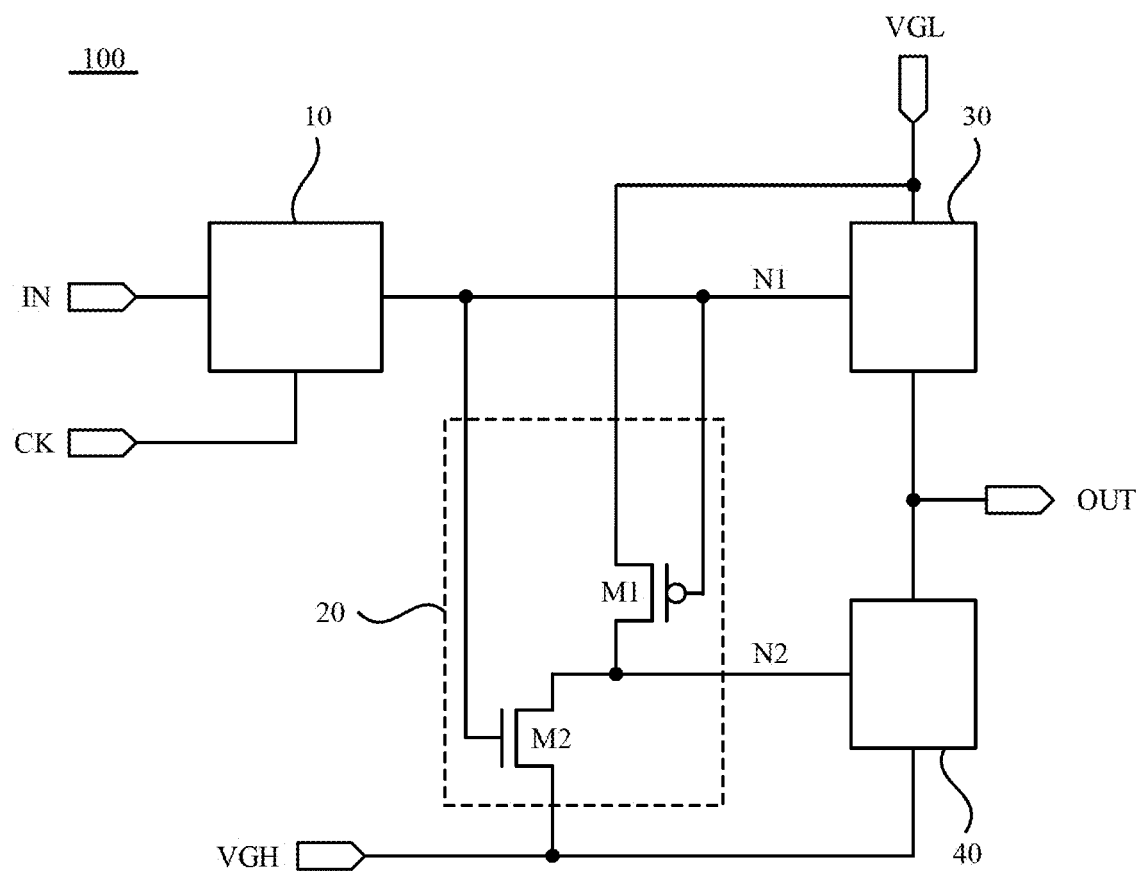
FIG. 3 is a diagram illustrating the structure of yet another shift register circuit according to embodiments of the present application.

Optionally, FIG. 2 is a diagram illustrating the structure of another shift register circuit according to embodiments of the present application, and FIG. 3 is a diagram illustrating the structure of yet another shift register circuit according to embodiments of the present application. Referring to FIG. 2 or 3, the second control module 20 includes a first transistor M1 and a second transistor M2. The gate of the first transistor M1 and the gate of the second transistor M2 are each electrically connected to the first node N1. The first electrode of the first transistor M1 is electrically connected to the first level terminal VGL, and the second electrode of the first transistor M1 is electrically connected to the second node N2. The first electrode of the second transistor M2 is electrically connected to the second level terminal VGH, and the second electrode of the second transistor M2 is electrically connected to the second node N2. The first transistor M1 and the second transistor M2 have different channel types.

In an embodiment, since the first transistor M1 and the second transistor M2 have different channel types, the potential of the first node N1 can control the first transistor M1 and the second transistor M2 to be turned on or off in a time-sharing manner. When the potential VN1 of the first node N1 controls the first transistor M1 to be turned on and controls the second transistor M2 to be turned off, the first level signal Vgl of the first level terminal VGL can be transmitted to the second node N2 through the turned-on first transistor M1 so that the potential VN2 of the second node N2 can be consistent with the first level signal Vgl. When the potential VN1 of the first node N1 controls the second transistor M2 to be turned on and controls the first transistor M1 to be turned off, the second level signal Vgh of the second level terminal VGH can be transmitted to the second node N2 through the turned-on second transistor M2 so that the signal of the second node N2 can be consistent with the second level signal Vgh. In this way, the second control module 20 includes two transistors having different channel types so that the potential VN1 of the first node N1 can control the first transistor M1 and the second transistor M2 to be turned on in a time-sharing manner, thereby satisfying the requirement that the potential VN2 of the second node N2 is switched between a high level and a low level, and so that the second control module 20 can have a relatively simple structure and a relatively small size, thereby facilitating the reduction in the size of the shift register circuit.

It is to be understood that the first transistor M1 and the second transistor M2 have different channel types, that is, as shown in FIG. 2, when the first transistor M1 is an n-type transistor, the second transistor M2 is a p-type transistor, or, as shown in FIG. 3, when the first transistor M1 is a p-type transistor, the second transistor M2 is an n-type transistor. A p-type transistor is turned on when a signal received by the gate of the p-type transistor is at a low level and is turned off when the signal received by the gate of the p-type transistor is at a high level. An n-type transistor is turned on when a signal received by the gate of the n-type transistor is at a high level and is turned off when the signal received by the gate of the n-type transistor is at a low level. The first transistor M1 being an n-type transistor and the second transistor M2 being a p-type transistor is used as an example. When the potential VN1 of the first node N1 is at a high level, the first transistor M1 is turned on, and the second transistor M2 is turned off. When the potential VN1 of the first node N1 is at a low level, the first transistor M1 is turned off, and the second transistor M2 is turned on.

Figure 4:
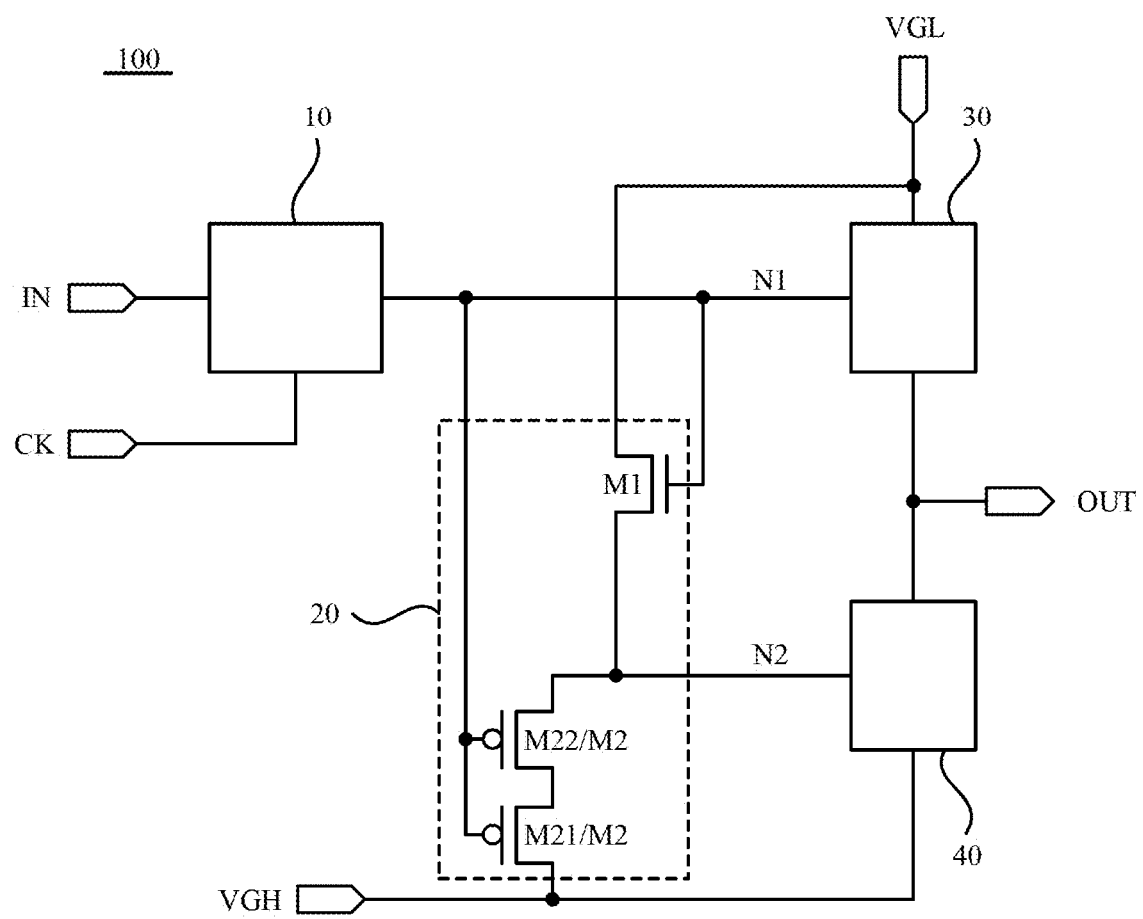
FIG. 4 is a diagram illustrating the structure of yet another shift register circuit according to embodiments of the present application.
Figure 5:
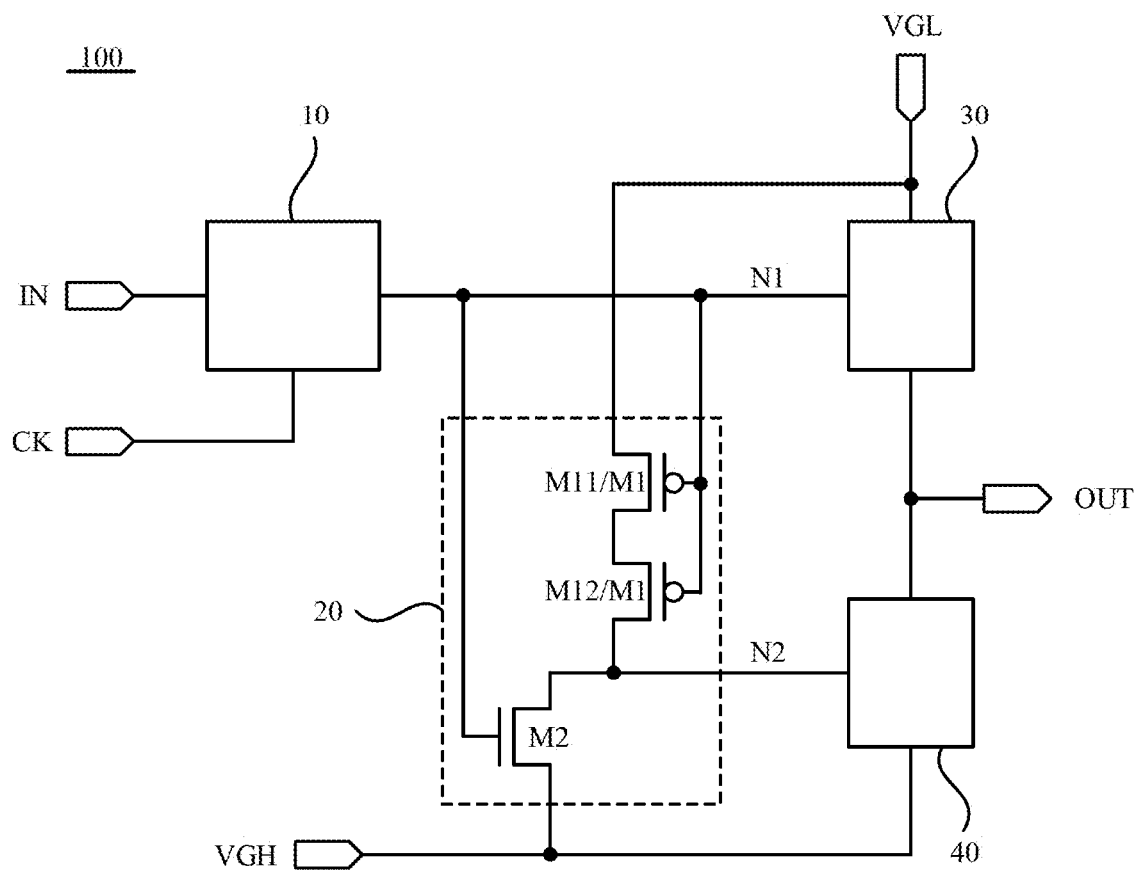
FIG. 5 is a diagram illustrating the structure of yet another shift register circuit according to embodiments of the present application.

In an optional embodiment, FIG. 4 is a diagram illustrating the structure of yet another shift register circuit according to embodiments of the present application, and FIG. 5 is a diagram illustrating the structure of yet another shift register circuit according to embodiments of the present application. Referring to FIG. 4 or 5, one of the first transistor M1 or the second transistor M2 is a p-type transistor, and the p-type transistor includes a first sub-transistor (M11 or M21) and a second sub-transistor (M12 or M22). The gate of the first sub-transistor (M11 or M21) and the gate of the second sub-transistor (M12 or M22) are each electrically connected to the first node N1. The first electrode of the first sub-transistor (M11 or M21) serves as the first electrode of the p-type transistor, the second electrode of the first sub-transistor (M11 or M21) is electrically connected to the first electrode of the second sub-transistor (M12 or M22), and the second electrode of the second sub-transistor (M12 or M22) serves as the second electrode of the p-type transistor.

In an exemplary embodiment, as shown in FIG. 4, when the second transistor M2 is a p-type transistor, the second transistor M2 includes a first sub-transistor M21 and a second sub-transistor M22. The gate of the first sub-transistor M21 and the gate of the second sub-transistor M22 are each electrically connected to the first node N1 so that the potential VN1 of the first node N1 can control the first sub-transistor M21 and the second sub-transistor M22 to synchronously turn on or off. In this case, the second transistor M2 is a double-gate transistor composed of the first sub-transistor M21 and the second sub-transistor M22. The first electrode of the first sub-transistor M21 is electrically connected to the second level terminal VGH, the second electrode of the first sub-transistor M21 is electrically connected to the first electrode of the second sub-transistor M22, and the second electrode of the second sub-transistor M22 is electrically connected to the second node N2 so that the first sub-transistor M21 and the second sub-transistor M22 can be synchronously turned on when the first node N1 is at a low level, and so that the second transistor M2 can have a relatively high mobility, relatively large on-state current, relatively small subthreshold swing and relatively stable threshold voltage, and so that the second level signal Vgh of the second level terminal VGH can be quickly and accurately transmitted to the second node N2. Moreover, when being at a high level, the first node N1 can control the first sub-transistor M21 and the second sub-transistor M22 to synchronously turn off so that the second transistor M2 can have a relatively small off-state leakage current, thereby improving the stability of the potential VN2 of the second node N2.

In another exemplary embodiment, as shown in FIG. 5, when the first transistor M1 is a p-type transistor, the first transistor M1 includes a first sub-transistor M11 and a second sub-transistor M12. The gate of the first sub-transistor M11 and the gate of the second sub-transistor M12 are each electrically connected to the first node N1 so that the potential VN1 of the first node N1 can control the first sub-transistor M11 and the second sub-transistor M12 to synchronously turn on or off. In this case, the first transistor M1 is a double-gate transistor composed of the first sub-transistor M11 and the second sub-transistor M12. The first electrode of the first sub-transistor M11 is electrically connected to the first level terminal VGL, the second electrode of the first sub-transistor M11 is electrically connected to the first electrode of the second sub-transistor M12, and the second electrode of the second sub-transistor M12 is electrically connected to the second node N2 so that the first sub-transistor M11 and the second sub-transistor M12 can be synchronously turned on when the first node N1 is at a low level, and so that the first transistor M1 can have a relatively high mobility, relatively large on-state current, relatively small subthreshold swing and relatively stable threshold voltage, and so that the first level signal Vgl of the first level terminal VGL can be quickly and accurately transmitted to the second node N2. Moreover, when being at a high level, the first node N1 can control the first sub-transistor M11 and the second sub-transistor M12 to synchronously turn off so that the first transistor M1 can have a relatively small off-state leakage current, thereby improving the stability of the potential VN2 of the second node N2.

It is to be understood that the case where the first transistor M1 is a p-type transistor and the case where the second transistor M2 is a p-type transistor are respectively illustrated in the preceding. The types of the first transistor M1 and the second transistor M2 may be selected according to actual needs, for example, may be selected in terms of saving space, simplifying process steps and the like. The specific types of the first transistor M1 and the second transistor M2 are not limited in the embodiments of the present application on the premise that the core inventive point of the embodiments of the present application can be implemented. For ease of description, unless otherwise specified, the technical solutions of the embodiments of the present application are illustrated using an example in which the first transistor M1 is an n-type transistor, and the second transistor M2 is a p-type transistor in the embodiments of the present application.

Figure 6:
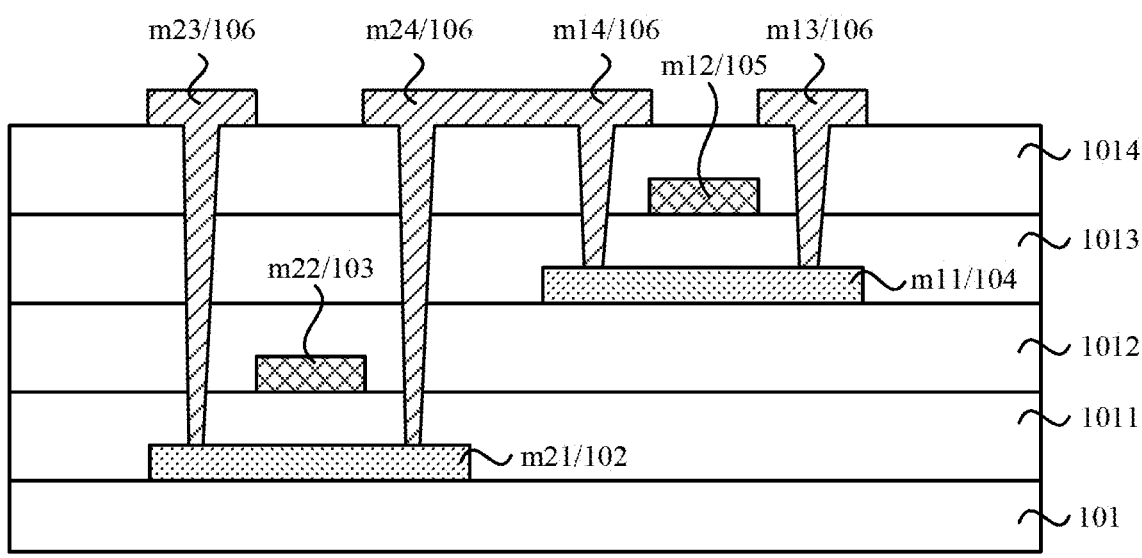
FIG. 6 is a diagram illustrating the film structure of a shift register circuit according to embodiments of the present application.

Based on the preceding embodiments, optionally, FIG. 6 is a diagram illustrating the film structure of a shift register circuit according to embodiments of the present application. In conjunction with FIGS. 2 and 6, the shift register circuit 100 further includes a base substrate 101; and a first semiconductor layer 102 and a second semiconductor layer 104 that are located on one side of the base substrate 101 and are insulated from each other. The first semiconductor layer 102 includes a first active layer m21, and the second semiconductor layer 104 includes a second active layer m11. The first semiconductor layer 102 and the second semiconductor layer 104 are made of different materials. One of the first active layer m21 or the second active layer m11 serves as the active layer of the first transistor M1 while the other one of the first active layer m21 or the second active layer m11 serves as the active layer of the second transistor M2.

That the first transistor M1 is an n-type transistor, and the second transistor M2 is a p-type transistor is used as an example. The material of the active layer of the n-type transistor may include an oxide semiconductor material, such as indium gallium zinc oxide, so that the N-type transistor can have a relatively high mobility, and the material of the active layer of the p-type transistor may include a low-temperature polysilicon material so that the p-type transistor can have a relatively high response rate. In this case, the active layer of the first transistor M1 and the active layer of the second transistor M2 need to be disposed in different films respectively to satisfy the process requirement. In an exemplary embodiment, the first active layer m21 located in the first semiconductor layer 102 may serve as the active layer of the second transistor M2, that is, the material of the first semiconductor layer 102 may include the low-temperature polysilicon material; and the second active layer m11 located in the second semiconductor 104 may serve as the active layer of the first transistor M1, that is, the material of the second semiconductor may include the oxide semiconductor material.

It is to be noted that FIG. 6 merely illustrates that the first semiconductor layer 102 is located between the second semiconductor layer 104 and the base substrate 101, and in the embodiments of the present application, the second semiconductor layer 104 may also be located between the first semiconductor layer 102 and the base substrate 101.

The relative positional relation between the first semiconductor layer and the second semiconductor layer and the base substrate is not specifically limited in the embodiments of the present application.

The relative positional relation between the first semiconductor layer 102 and the second semiconductor layer 104 and the base substrate 101 as shown in FIG. 6 is used as an example. The shift register circuit may further include a first conductive layer 103, a second conductive layer 105 and a third conductive layer 106. The first conductive layer 103 may include the gate m22 of the second transistor M2, the second conductive layer 105 may include the gate m12 of the first transistor M1, and the third conductive layer 106 may include the first electrode m13 and second electrode m14 of the first transistor M1 and the first electrode m23 and second electrode m24 of the second transistor M2. In this case, the second electrode m14 of the first transistor M1 and the second electrode m24 of the second transistor M2 that are electrically connected to the second node N2 may be directly interconnected without the need to dispose vias so that the connection relation of the first transistor M1 and the second transistor M2 can be simplified, thereby simplifying the film structure of the shift register circuit and reducing the size of the shift register circuit.

In addition, based on the preceding film structure, an insulating layer is also disposed between any two adjacent conductive layers and between a conductive layer and a semiconductor layer. For example, a first gate insulating layer 1011 is disposed between the first semiconductor layer 102 and the first conductive layer 103, a first interlayer insulating layer 1012 is disposed between the first conductive layer 103 and the second semiconductor layer 104, a second gate insulating layer 1013 is disposed between the second semiconductor layer 104 and the second conductive layer 105, and a second interlayer insulating layer 1013 is disposed between the second conductive layer 105 and the third conductive layer 106. The insulating layer is disposed between any two adjacent conductive layers and between a conductive layer and a semiconductor layer so that signals transmitted in component structures disposed and signal lines in films do not interfere with each other, and the accuracy of signal transmission can be facilitated.

The material of the first conductive layer 103 and the second conductive layer 105 may include, but is not limited to, a molybdenum aluminum alloy, chromium metal, molybdenum metal, or another conductive material having a low impedance. The material of the second conductive layer 106 may include, but is not limited to, a material having a high conductivity such as a titanium aluminum alloy. The material of each insulating layer includes, but is not limited to, silicon oxide or silicon nitride.

It is to be noted that FIG. 6 merely illustrates the structure in which the first transistor M1 and the second transistor M2 are each a top gate transistor, and in the embodiments of the present application, the first transistor M1 and the second transistor M2 may also be each a bottom gate transistor, or one of the first transistor M1 or the second transistor M2 is a top gate transistor while the other one of the first transistor M1 or the second transistor M2 is a bottom gate transistor, or for the case where the first transistor M1 or the second transistor M2 is a double-gate transistor, two gates of the double-gate transistor may be disposed in the same layer or may also be disposed in two opposite sides of the active layer of the double-gate transistor, that is, the double-gate transistor may simultaneously include a top gate and a bottom gate. This is not specifically limited in the embodiments of the present application on the premise that the core inventive point of the embodiments of the present application can be implemented.

Figure 7:
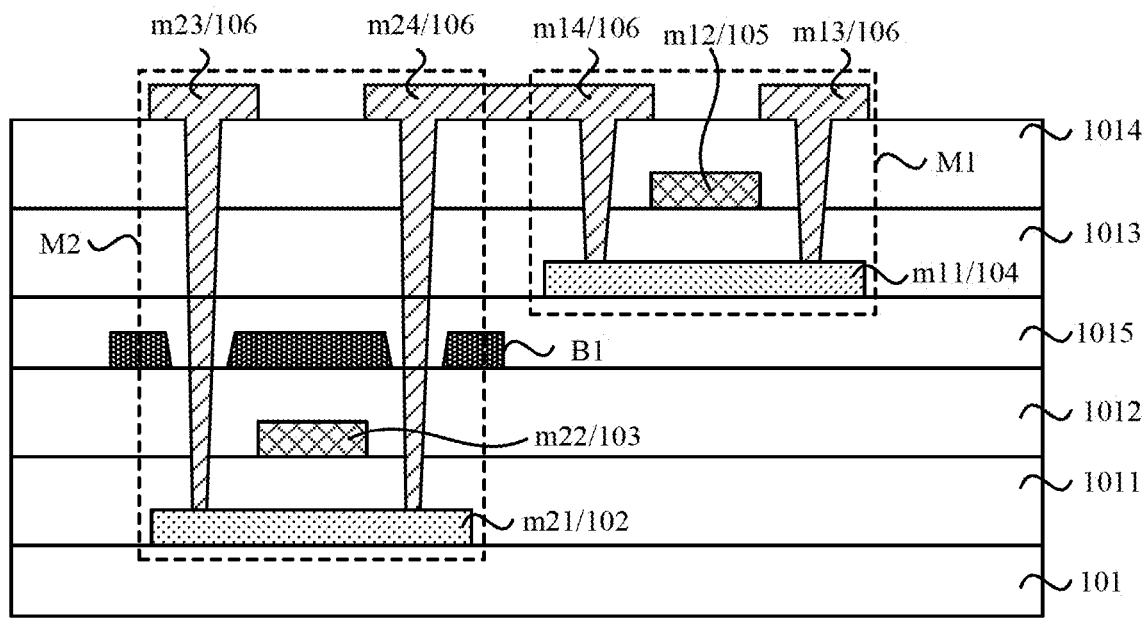
FIG. 7 is a diagram illustrating the film structure of another shift register circuit according to embodiments of the present application.

Optionally, FIG. 7 is a diagram illustrating the film structure of another shift register circuit according to embodiments of the present application. As shown in FIG. 7, the shift register circuit may further include a first light-shielding structure B1 located on one side of the first semiconductor layer 102 facing away from the base substrate 101, and the first light-shielding structure B1 overlaps the first active layer m21 in the direction perpendicular to the plane on which the base substrate 101 is located.

It is to be noted that part of the semiconductor material (such as a silicon-based material) generates photo-generated carriers due to the photovoltaic effect when the part of the semiconductor material is exposed to light, and when the material of the first semiconductor layer 102 is the part of material, if external light is incident on the first active layer m21 of the first semiconductor layer 102, carriers in the first active layer m21 will mobilize so that a transistor (the second transistor M2) including the first active layer m21 generates a leakage current that affects the stability of the potential of the node electrically connected to the transistor.

In this embodiment, the first light-shielding structure B1 is located on the side of the first semiconductor layer 102 facing away from the base substrate 101, and the first light-shielding structure B1 overlaps the first active layer m21 located in the first semiconductor layer 102 in the direction perpendicular to the plane on which the base substrate 101 is located so that the first light-shielding structure B1 can block at least part of light incident on the side of the first semiconductor layer 102 facing away from the base substrate 101, thereby preventing this part of light from irradiating the first active layer m21, reducing the leakage current generated by the second transistor M2 including the first active layer m21 and improving the stability of the potential of the node electrically connected to the second transistor M2.

Figure 8:
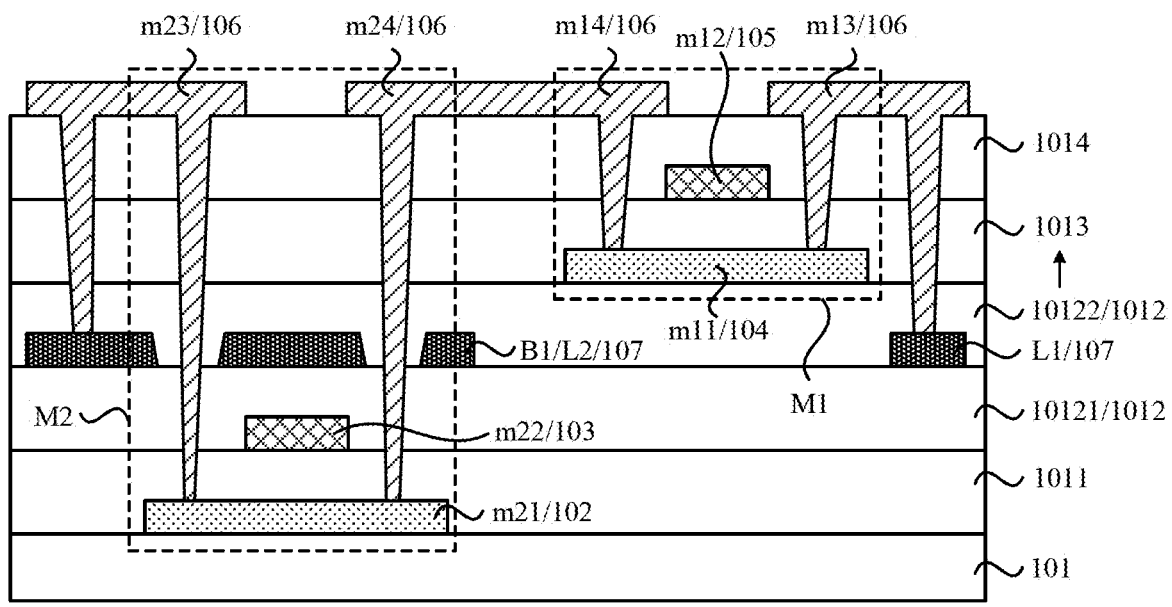
FIG. 8 is a diagram illustrating the film structure of yet another shift register circuit according to embodiments of the present application.

Optionally, based on the preceding embodiments, FIG. 8 is a diagram illustrating the film structure of yet another shift register circuit according to embodiments of the present application. As shown in FIG. 8, the shift register circuit may further include a first metal layer 107 located on the side of the first semiconductor layer 102 facing away from the base substrate 101. The first metal layer 107 includes fixed signal transmission lines (L1, L2). At least part of a fixed signal transmission line (L2) also serves as at least part of the first light-shielding structure B1. A fixed signal transmission line (L1 or L2) is used for transmitting the first level signal Vgl or the second level signal Vgh.

Exemplarily, that the first metal layer 107 simultaneously includes the fixed signal transmission line L1 for transmitting the first level signal Vgl and the fixed signal transmission line L2 for transmitting the second level signal Vgh is used as an example. In this case, the first electrode m13 of the first transistor M1 may be electrically connected to the fixed signal transmission line L1 located in the first metal layer 107 through a via, and the first electrode m23 of the second transistor M2 may also be electrically connected to the fixed signal transmission line L2 located in the first metal layer 107 through a via. In this case, the fixed signal transmission line L2 electrically connected to the first electrode m23 of the second transistor M2 may also serve as the first light-shielding structure B1 so that there is no need to dispose an additional light-shielding structure B1, thereby simplifying the structure of the shift register circuit and the art process of the shift register circuit, reducing the preparation cost of the shift register circuit and further reducing the size of the shift register circuit. The material of the first metal layer 107 may include, but is not limited to, aluminum alloy, chromium metal, or molybdenum metal that has both light-shielding and conductivity abilities. This is not specifically limited in the embodiments of the present application.

In addition, the preceding merely illustrates that the first metal layer 107 is disposed between the first conductive layer 103 and the second semiconductor layer 104. In this case, the first interlayer insulating layer 1012 may include an insulating layer 10121 located between the first metal layer 107 and the first conductive layer 103 and an insulating layer 10122 located between the first metal layer 107 and the second semiconductor layer 104. The insulating layer 10121 and the insulating layer 10122 may be made of the same material or different materials, and this is not specifically limited in the embodiments of the present application.

It is to be noted that the embodiments of the present application are not limited to the preceding film relation between the first metal layer, the first semiconductor layer and the second semiconductor layer. For example, the first metal layer may also be located on one side of the second semiconductor layer facing away from the base substrate. In this case, the first metal layer may also serve as the third conductive layer to further simplify the film structure of the shift register circuit. Alternatively, in other optional embodiments, the first conductive layer or the second conductive layer may also serve as the first metal layer so that the film structure of the shift register circuit can also be simplified. The disposed position of the first metal layer is not specifically limited in the embodiments of the present application on the premise that the core inventive point of the embodiments of the present application can be implemented.

It is to be understood that the preceding merely illustrates the relative positional relations of films in the shift register circuit, and the relative positional relations of the films, and component structures and signal lines disposed in the films are not specifically limited in the embodiments of the present application on the premise that the channel types of the active layers of the first transistor and the second transistor are different.

Figure 9:
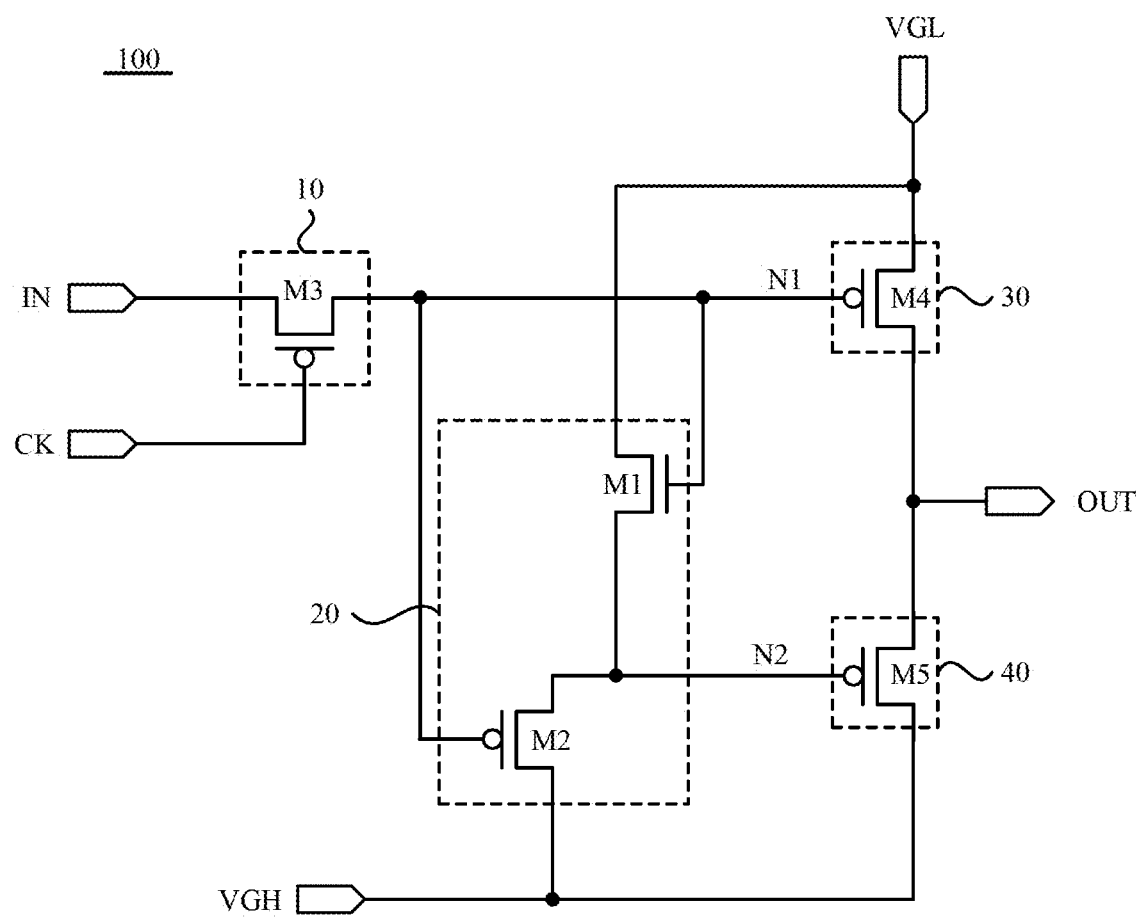
FIG. 9 is a diagram illustrating the structure of yet another shift register circuit according to embodiments of the present application.

Optionally, FIG. 9 is a diagram illustrating the structure of yet another shift register circuit according to embodiments of the present application. As shown in FIG. 9, the first control module 10 may include a third transistor M3. The gate of the third transistor M3 is electrically connected to the clock signal terminal CK, the first electrode of the third transistor M3 is electrically connected to the signal input terminal IN, and the second electrode of the third transistor M3 is electrically connected to the first node N1. In this case, the third transistor M3 may be turned on or off under the control of the clock signal ck of the clock signal terminal CK, and when the third transistor M3 is turned on, the input signal Vin of the signal input terminal IN can be transmitted to the first node N1 so that the signal of the first node N1 can be consistent with the input signal Vin of the signal input terminal IN. In this way, the first control module 10 is only made of the third transistor M3, and the control of the potential VN1 of the first node N1 can be implemented by controlling the third transistor M3 to be turned on or off so that the first control module 10 can have a simple structure and a relatively small size, the structure of the shift register circuit can be simplified, and the size of the shift register circuit can be reduced.

The third transistor M3 may be an n-type transistor or a p-type transistor. When the third transistor M3 is an n-type transistor, a high level of the clock signal ck controls the third transistor M3 to be turned on, and a low level of the clock signal ck controls the third transistor M3 to be turned off. When the third transistor M3 is a p-type transistor, the low level of the clock signal ck controls the third transistor M3 to be turned on, and the high level of the clock signal ck controls the third transistor M3 to be turned off. For ease of description, unless otherwise specified, the third transistor being a p-type transistor is used as an example for illustration in the embodiments of the present application.

Figure 10:
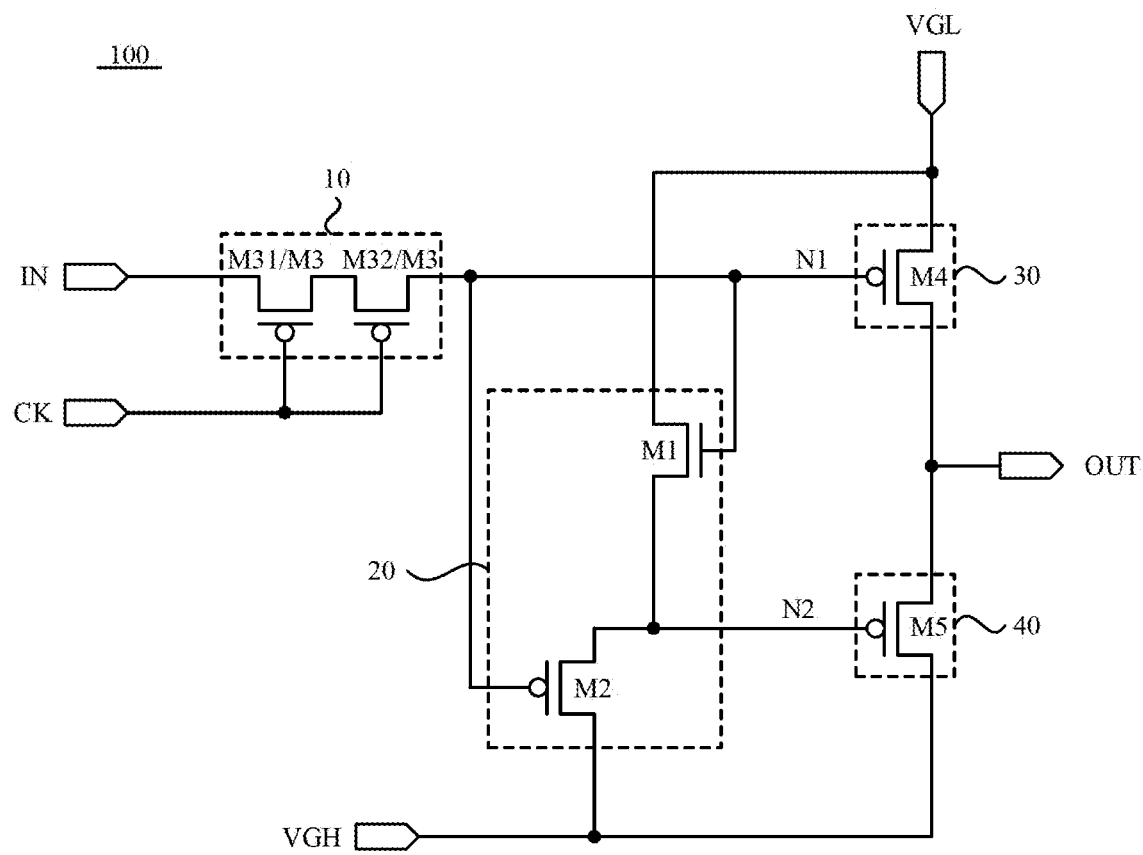
FIG. 10 is a diagram illustrating the structure of yet another shift register circuit according to embodiments of the present application.

Optionally, FIG. 10 is a diagram illustrating the structure of yet another shift register circuit according to embodiments of the present application. As shown in FIG. 10, the third transistor M3 may include a fifth sub-transistor M31 and a sixth sub-transistor M32. The gate of the fifth sub-transistor M31 and the gate of the sixth sub-transistor M32 are electrically connected to the clock signal terminal CK. The first electrode of the fifth sub-transistor M31 is electrically connected to the signal input terminal IN, the second electrode of the fifth sub-transistor M31 is electrically connected to the first electrode of the sixth sub-transistor M32, and the second electrode of the sixth sub-transistor M32 is electrically connected to the first node N1.

In an embodiment, since the gate of the fifth sub-transistor M31 and the gate of the sixth sub-transistor M32 are electrically connected to the clock signal terminal CK, the clock signal ck of the clock signal terminal CK can control the fifth sub-transistor M31 and the sixth sub-transistor M32 to synchronously turn on or off so that the third transistor M3 can be a double-gate transistor composed of the fifth sub-transistor M31 and the sixth sub-transistor M32. In this way, when the clock signal ck controls the fifth sub-transistor M31 and the sixth sub-transistor M32 to synchronously turn on, the third transistor M3 can have a relatively high mobility, relatively large on-state current, relatively small subthreshold swing and relatively stable threshold voltage so that the input signal Vin of the signal input terminal IN can be quickly and accurately transmitted to the first node N1. When the clock signal ck controls the fifth sub-transistor M31 and the sixth sub-transistor M32 to synchronously turn off, the third transistor M3 can have a relatively small off-state leakage current so that the potential of the first node N1 can remain stable.

Figure 11:
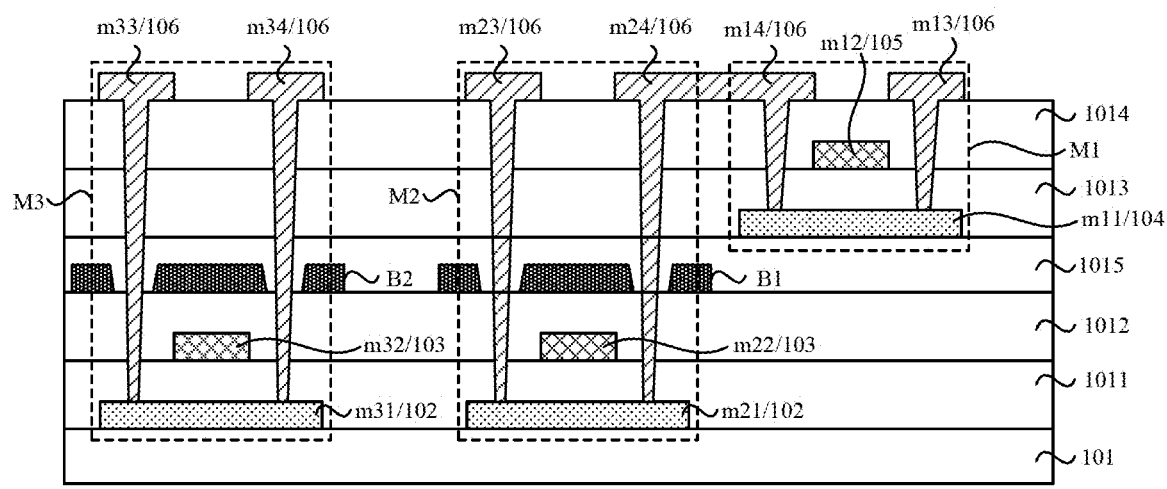
FIG. 11 is a diagram illustrating the film structure of yet another shift register circuit according to embodiments of the present application.

Based on the preceding embodiments, optionally, FIG. 11 is a diagram illustrating the film structure of yet another shift register circuit according to embodiments of the present application. As shown in FIG. 11, the shift register circuit may include the base substrate 101; the first semiconductor layer 102 located on the side of the base substrate 101, where the first semiconductor layer 102 includes a third active layer m31, and the third active layer m31 serves as the active layer of the third transistor M3; and a second light-shielding structure B2 located on the side of the first semiconductor layer 102 facing away from the base substrate 101. The second light-shielding structure B2 overlaps the third active layer m31 in the direction perpendicular to the plane on which the base substrate 101 is located.

When the first semiconductor layer includes a material which, when being exposed to light, generates photo-generated carriers, and external light is incident on the third active layer m31 of the first semiconductor layer from the side of the first semiconductor layer 102 facing away from the base substrate 101, carriers in the third active layer m31 mobilize so that the third transistor M3 including the third active layer m31 generates a leakage current that affects the stability of the potential of the first node electrically connected to the third transistor M3. In this way, the second light-shielding structure B2 is disposed on one side of the third active layer m31 facing away from the base substrate 101 so that the second light-shielding structure B2 can block at least part of light incident on the side of the first semiconductor layer 102 facing away from the base substrate 101, thereby preventing this part of light from irradiating the third active layer m31, reducing the leakage current generated by the third transistor M3 including the third active layer m31 and improving the stability of the potential of the first node electrically connected to the third transistor M3.

It is to be understood that in addition to the third active layer m31 of the third transistor M3, the first semiconductor layer 102 may further include active layers of other transistors having the same channel type as the third transistor M3. For example, when the third transistor M3 has the same channel type as the second transistor M2, the first semiconductor layer 102 may simultaneously include the active layer m31 of the third transistor M3 and the active layer m21 of the second transistor M2 so that the active layer m31 of the third transistor M3 and the active layer m21 of the second transistor M2 can be disposed in the same layer. In addition, the gate m32 of the third transistor M3 may also be disposed in the same layer as the gate m22 of the second transistor M2, and the first electrode m33 and second electrode m34 of the third transistor M3 may be disposed in the same layer as the first electrode m23 and second electrode m24 of the second transistor M2. In this way, there is no need to add an additional film to dispose the third transistor M3, and structures of the third transistor M3 and structures of the second transistor M2 may be prepared by using the same material in the same process so that the process of the shift register circuit can be simplified, and the preparation cost of the shift register circuit can be reduced.

Correspondingly, the first light-shielding structure B1 may also be disposed in the same layer as the second light-shielding structure B2 so that there is no need to add an additional film to dispose the second light-shielding structure B2, and the first light-shielding structure B1 and the second light-shielding structure B2 can be prepared by using the same material in the same process, further simplifying the process of the shift register circuit and reducing the preparation cost of the shift register circuit.

It is to be noted that FIG. 11 merely illustrates the structure in which the third transistor M3 is a top gate transistor, and in the embodiments of the present application, the third transistor M3 may also be a bottom gate transistor, or for the case where the third transistor M3 is a double-gate transistor, two gates of the double-gate transistor may be disposed in the same layer or may also be disposed in two opposite sides of the active layer of the double-gate transistor, that is, the double-gate transistor may simultaneously include a top gate and a bottom gate. This is not specifically limited in the embodiments of the present application on the premise that the core inventive point of the embodiments of the present application can be implemented.

Optionally, with continued reference to FIG. 9 or 10, the first output module 30 may include a first output transistor M4. The gate of the first output transistor M4 is electrically connected to the first node N1, the first electrode of the first output transistor M4 is electrically connected to the first level terminal VGL, and the second electrode of the first output transistor M4 is electrically connected to the signal output terminal OUT. The first output transistor M4 and the first transistor M1 have different channel types, that is, when the first transistor M1 is an n-type transistor, the first output transistor M4 is a p-type transistor, or when the first transistor M1 is a p-type transistor, the first output transistor M4 is an n-type transistor so that the potential of the first node N1 can control the first transistor M1 and the first output transistor M4 to be turned on in a time-sharing manner.

Optionally, with continued reference to FIG. 9 or 10, the second output module 40 may include a second output transistor M5. The gate of the second output transistor M5 is electrically connected to the second node N2, the first electrode of the second output transistor M5 is electrically connected to the second level terminal VGH, and the second electrode of the second output transistor M5 is electrically connected to the signal output terminal OUT. The second output transistor M5 and the first output transistor M4 have the same channel type, that is, the first output transistor M4 and the second output transistor M5 are p-type transistors or both of them are n-type transistors.

Exemplarily, that the first transistor M1 is an n-type transistor, and the second transistor M2, the first output transistor M4 and the second output transistor M5 are each a p-type transistor is used as an example. When the potential of the first node N1 is at a high level, the first output transistor M4 and the second transistor M2 are turned off, and the first transistor M1 is turned on so that the first level signal Vgl of the first level terminal VGL cannot be transmitted to the signal output terminal OUT but can be transmitted to the second node N2, and the second level signal Vgh of the second level terminal VGH cannot be transmitted to the second node N2, and so that the potential VN2 of the second node N2 can be consistent with the first level signal Vgl. At this time, the potential VN2 of the second node N2 can control the second output transistor M5 to be turned on so that the second level signal Vgh of the second level terminal VGH can be transmitted to the signal output terminal OUT, and so that the gate drive signal Gout output by the signal output terminal OUT can be consistent with the second level signal Vgh. When the potential of the first node N1 is at a low level, the first output transistor M4 and the second transistor M2 are turned on, and the first transistor M1 is turned off so that the first level signal Vgl of the first level terminal VGL can be transmitted to the signal output terminal OUT but cannot be transmitted to the second node N2, and the second level signal Vgh of the second level terminal VGH can be transmitted to the second node N2, and so that the potential VN2 of the second node N2 can be consistent with the second level signal Vgh. At this time, the potential VN2 of the second node N2 controls the second output transistor M5 to be turned off so that the second level signal Vgh of the second level terminal VGH cannot be transmitted to the signal output terminal OUT, and so that the gate drive signal Gout output by the signal output terminal OUT can be consistent with the first level signal Vgl. In this way, the first output transistor M4, the second output transistor M5 and the second transistor M2 have the same channel type, and the first output transistor M4 and the first transistor M1 have different channel types so that the signal output terminal OUT can be ensured to output a high level and a low level of the gate drive signal Gout in a time-sharing manner, and the stable output of the shift register circuit can be ensured.

In addition, since the first output module 30 only includes the first output transistor M4, and the second output module 40 only includes the second output transistor M5, the first output module 30 and the second output module 40 can each have a simple structure and a relatively small size, thereby simplifying the structure of the shift register circuit and reducing the size of the shift register circuit.

Figure 12:
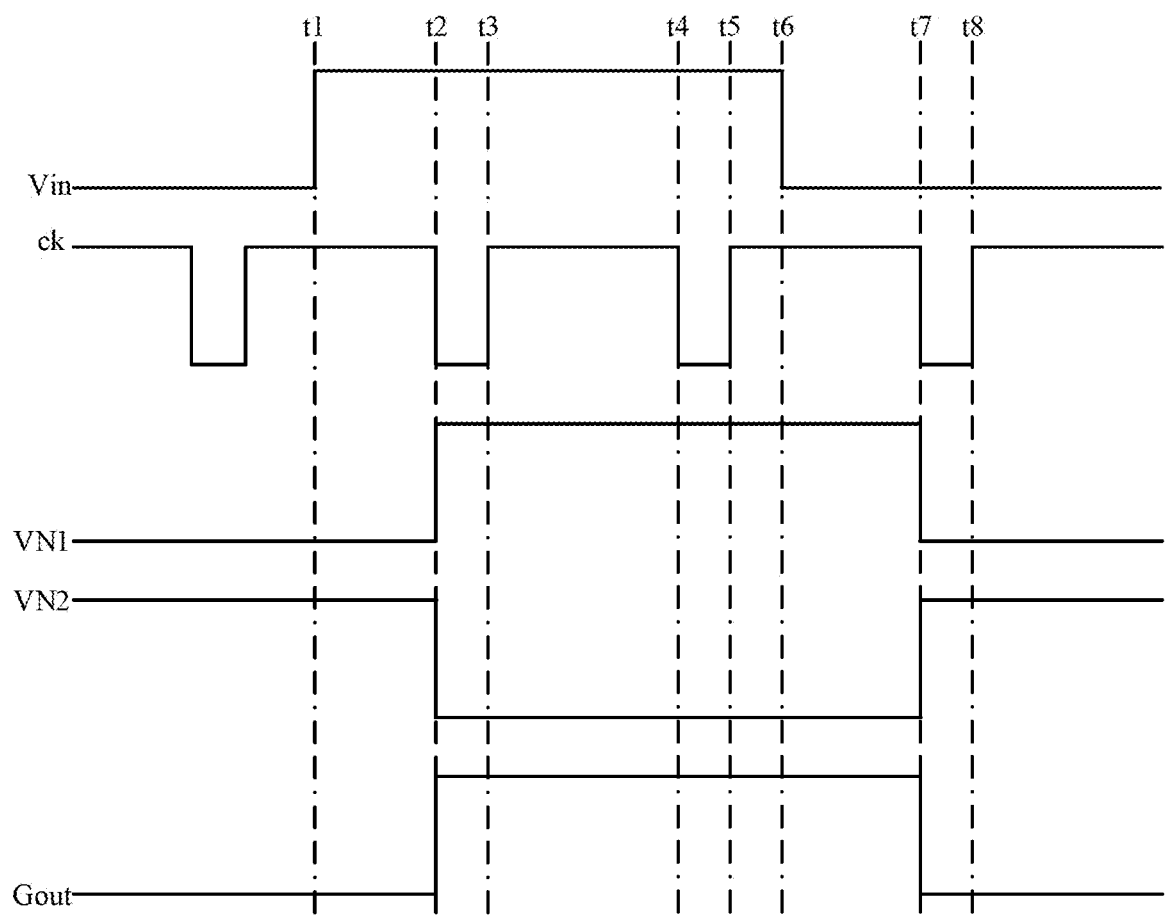
FIG. 12 is a drive timing diagram of a shift register circuit according to embodiments of the present application.

Exemplarily, that the first transistor M1 is an n-type transistor, and other transistors are each a p-type transistor is used as an example, and FIG. 12 is a drive timing diagram of a shift register circuit according to embodiments of the present application. In conjunction with FIGS. 9 and 12, before the moment t1, when the input signal Vin is at a low level and enables the clock signal ck to control the third transistor M3 to be turned on, the low-level input signal Vin can be transmitted to the first node N1 so that the potential VN1 of the first node N1 can remain at a low level continuously. The low-level signal can control the first output transistor M4 and the second transistor M2 to be in an on state and the first transistor M1 to be in an off state, the first level signal Vgl of the first level terminal VGL can be transmitted to the signal output terminal OUT, and the second level signal Vgh of the second level terminal VGH can be transmitted to the second node N2 so that the potential VN2 of the second node N2 can be at a high level and control the second output transistor M5 to be turned off, and the gate drive signal Gout output by the signal output terminal OUT can be at a low level.

At the moment t1, the input signal Vin hops from being at a low level to being at a high level, but since the clock signal ck is at a high level at this time point, the third transistor M3 is at an off state, and the potential VN1 of the first node N1 remains at the low level before the moment t1.

In the period from the moment t2 to the moment t3, the clock signal ck is at a low level, so the third transistor M3 is turned on, and the high-level input signal Vin is transmitted to the first node N1 so that the first node N1 can hop from being at a low level to being at a high level. The potential VN1 of the first node N1 controls the first transistor M1 to be turned on and controls the first output transistor M4 and the second transistor M2 to be turned off, the first level signal Vgl is transmitted to the second node N2, the potential VN2 of the second node N2 hops to be at a low level and controls the second output transistor M5 to be turned on, and the second level signal Vgh is transmitted to the signal output terminal OUT so that the gate drive signal Gout output by the signal output terminal OUT can hop to be at a high level.

In the period from the moment t4 to the moment t5, the clock signal ck hops to be at a low level again, and the high-level input signal Vin can be supplemented to the first node N1 so that the potential VN1 of the first node N1 can remain at the high level continuously, and the potential VN2 of the second node N2 can remain at the low level continuously.

At the moment t6, the input signal Vin hops from being at a high level to being at a low level, but since the clock signal ck is at a high level at this time, the third transistor M3 is in an off state, and the potential VN1 of the first node N1 remains at the high level at the previous moment, and the potential VN2 of the second node N2 remains at the low level at the previous moment.

In the period from the moment t7 to the moment t8, the clock signal ck hops to be at a low level again, so the third transistor M3 is turned on, and the low-level input signal Vin is transmitted to the first node N1 so that the first node N1 can hop from being at a high level to being at a low level. The potential VN1 of the first node N1 controls the first output transistor M4 and the second transistor M2 to be turned on and controls the first transistor M1 to be turned off, the first level signal Vgl is transmitted to the signal output terminal OUT, the second level signal Vgh is transmitted to the second node N2, the potential VN2 of the second node N2 hops to be at a high level again, and the second output transistor M5 is turned off so that the gate drive signal Gout output by the signal output terminal OUT can hop from being at a high level to being at a low level.

After the moment t8, the clock signal ck undergoes a cyclical change between being at a high level and being at a low level, and the input signal Vin remains at the low level continuously so that the potential VN1 of the first node N1 can remain at the low level continuously, and the potential VN2 of the second node N2 can remain at the high level continuously until the input signal Vin hops to be at a high level again, and the preceding process is repeated.

It is to be understood that the operation process of the shift register circuit of the embodiments of the present application is exemplarily illustrated in the preceding using an example in which the first transistor M1 is an n-type transistor, and other transistors are each a p-type transistor, and types of transistors in the embodiments of the present application may be disposed according to actual needs and are not specifically limited in the embodiments of the present application.

Figure 13:
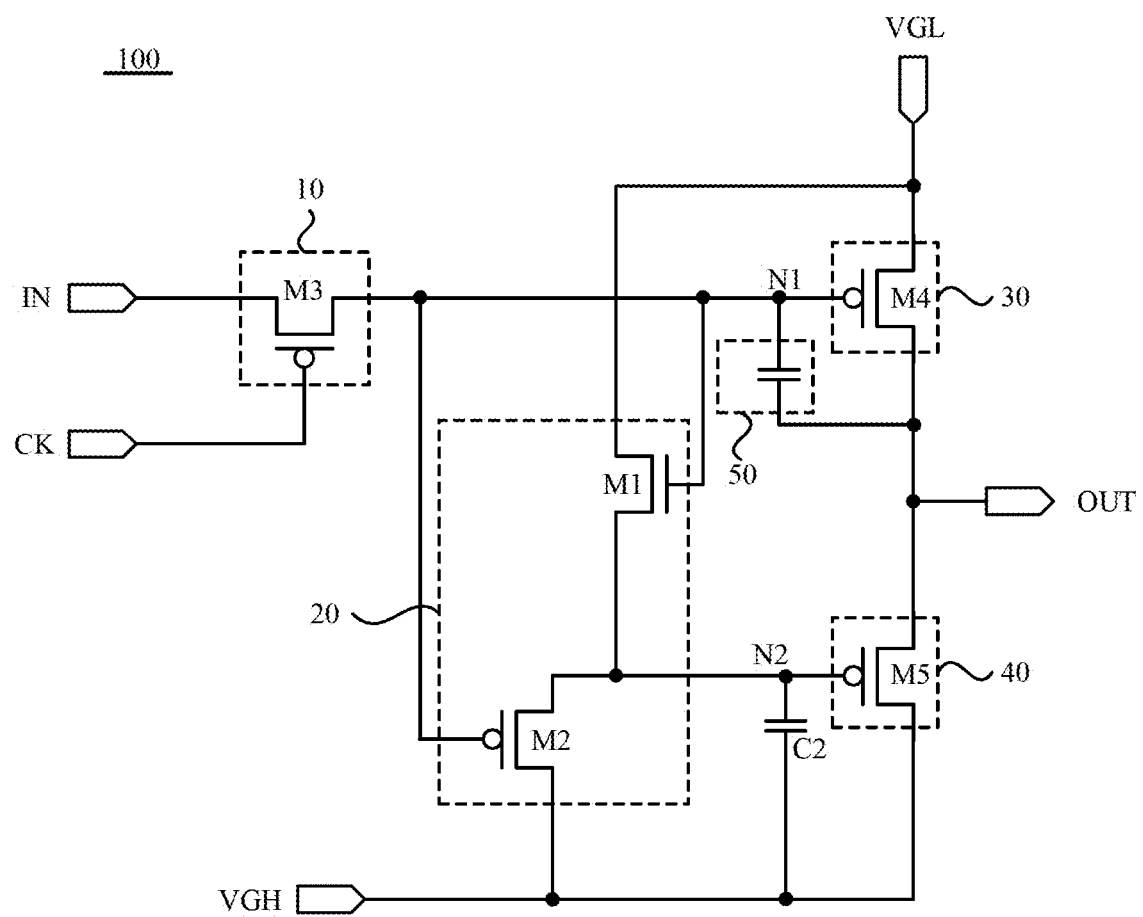
FIG. 13 is a diagram illustrating the structure of yet another shift register circuit according to embodiments of the present application.

Based on the preceding embodiments, optionally, FIG. 13 is a diagram illustrating the structure of yet another shift register circuit according to embodiments of the present application. As shown in FIG. 13, the shift register circuit 100 may further include a bootstrap module 50. The bootstrap module 50 is electrically connected between the first node N1 and the signal output terminal OUT and is configured to control the potential of the first node N1 and the potential of the signal output terminal OUT to have the same variation.

That the first transistor M1 is an n-type transistor, and other transistors are each a p-type transistor is used as an example. The signal of the first node N1 is supplied by the first control module 10, and when the first control module 10 includes the third transistor M3, and the input signal Vin of the signal input terminal IN is transmitted to the first node N1 via the third transistor M3, there is a voltage difference between the input signal Vin and the potential VN1 of the first node N1 due to the presence of the impedance caused by the third transistor M3, and the voltage difference may be equal to the threshold voltage Vth3 of the third transistor M3 so that the first node N1's potential VN1=Vin−Vth3. Moreover, since the third transistor M3 is a p-type transistor, the Vth3 can be negative, and VN1=Vin+|Vth3|, that is, the potential VN1 of the first node N1 is higher than the input signal Vin. This can enable the potential VN1 of the first node N1 to be relatively high and affect the conduction state of the first output transistor M4 so that the first output transistor M4 cannot transmit the first level signal Vgl to the signal output terminal OUT accurately.

In view of the preceding, the bootstrap module 50 is disposed between the signal output terminal OUT and the first node N1, so when the gate drive signal output by the signal output terminal OUT hops from being at a high level to being at a low level, the bootstrap module 50 can control the potential VN1 of the first node N1 to have the same variation as the signal output terminal OUT so that the potential VN1 of the first node N1 can be further pulled down, thereby enabling the potential VN1 of the first node N1 to control the first output transistor M4 to be in a normal conduction state, and so that the first level signal Vgl can be transmitted to the signal output terminal OUT quickly to prevent the output tailing due to a relatively high potential of the first node N1, thereby improving the stability of the gate drive signal Gout output by the signal output terminal OUT.

In an optional embodiment, with continued reference to FIG. 13, the bootstrap module 50 may include a bootstrap capacitance C1. The first plate of the bootstrap capacitance C1 is electrically connected to the first node N1, and the second plate of the bootstrap capacitance C1 is electrically connected to the signal output terminal OUT. In this way, when the signal of the signal output terminal OUT changes, the potential VN1 of the first node N1 also changes correspondingly due to the coupling action of the bootstrap capacitance C1, and when the potential VN1 of the first node N1 changes, the signal of the signal output terminal OUT may also change due to the coupling action of the bootstrap capacitance C1 so that the accuracy of the potential VN1 of the first node N1 and the gate drive signal Gout output by the signal output terminal OUT can be improved.

Optionally, with continued reference to FIG. 13, the shift register circuit 100 may further include a first capacitance C2. The first plate of the first capacitance C2 is electrically connected to a fixed signal terminal, and the second plate of the first capacitance C2 is electrically connected to the second node N2. The first capacitance C1 can store the potential VN2 of the second node N2 and maintain the stability of the potential VN2 of the second node N2. The second level terminal VGH may also serve as the fixed signal terminal electrically connected to the first plate of the first capacitance C2 to reduce the number of ports in the shift register circuit and the number of signals supplied to the shift register circuit and simplify the structure of the shift register circuit.

Figure 14:
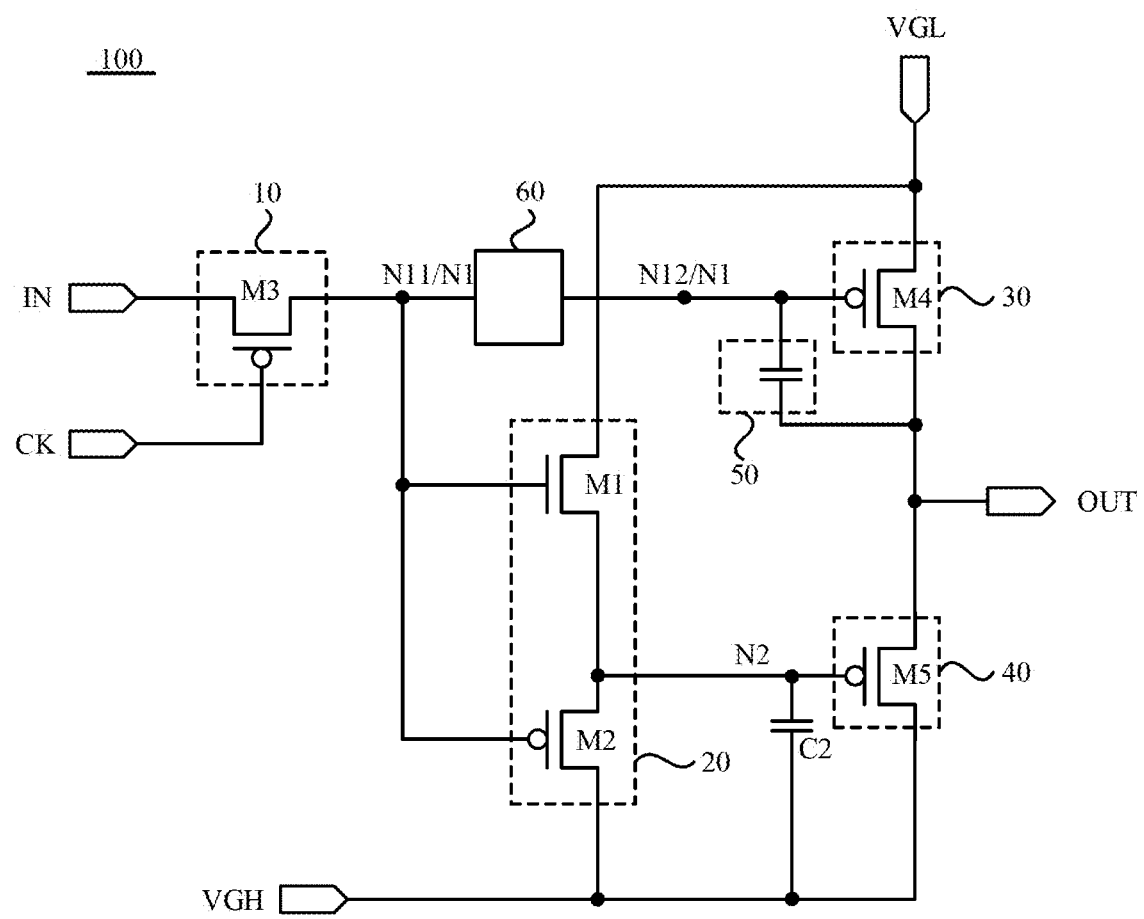
FIG. 14 is a diagram illustrating the structure of yet another shift register circuit according to embodiments of the present application.

Based on the preceding embodiments, FIG. 14 is a diagram illustrating the structure of yet another shift register circuit according to embodiments of the present application. As shown in FIG. 14, the first node N1 may include a first sub-node N11 and a second sub-node N12. In this case, the shift register circuit 100 may further include a voltage regulation module 60. The voltage regulation module 60 is electrically connected between the first sub-node N11 and the second sub-node N12 and is configured to regulate the potential of the first sub-node N11 and the potential of the second sub-node N12, that is, the voltage regulation module 60 can isolate the first sub-node N11 from the second sub-node N12, ensure the relative stability of signals of the first sub-node N11 and the second sub-node N12 and prevent the accuracy of the gate drive signal Gout output by the signal output terminal OUT of the shift register circuit 100 being affected by the fluctuation of the first sub-node N11 and/or the second sub-node N12 so that the operation stability of the shift register circuit 100 can be improved. When the potential of the first sub-node N11 and the potential of the second sub-node N12 are within the normal range, the voltage regulation module 60 is in a conduction state continuously so that the potential of the first sub-node N11 and the potential of the second sub-node N12 can remain consistent basically.

In an optional embodiment, with continued reference to FIG. 14, when the first node N1 includes the first sub-node N11 and the second sub-node N12, the gate of the first transistor M1 and the gate of the second transistor M2 are each electrically connected to the first sub-node N11. In this case, the potential VN11 of the first sub-node N11 can control the first transistor M1 and the second transistor M2 to be turned on in a time-sharing manner. The second sub-node N12 is electrically connected to fewer loads so that the stability of the potential VN12 of the second sub-node N12 can be improved.

Figure 15:
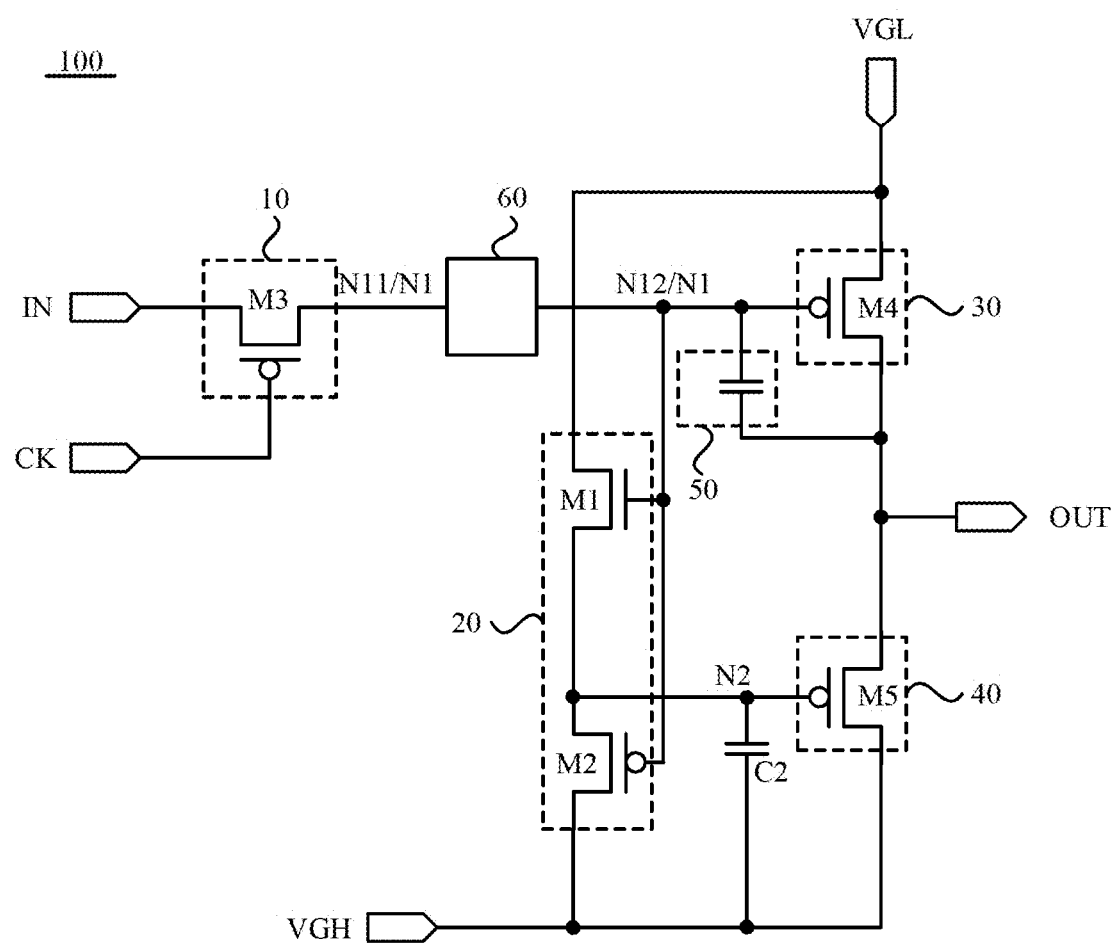
FIG. 15 is a diagram illustrating the structure of yet another shift register circuit according to embodiments of the present application.

In another optional embodiment, as shown in FIG. 15, the gate of the first transistor M1 and the gate of the second transistor M2 are each electrically connected to the second sub-node N12. In this case, the potential VN12 of the second sub-node N12 can control the first transistor M1 and the second transistor M2 to be turned on in a time-sharing manner. The first sub-node N11 is electrically connected to fewer loads so that the stability of the potential VN11 of the first sub-node N11 can be improved.

Figure 16:
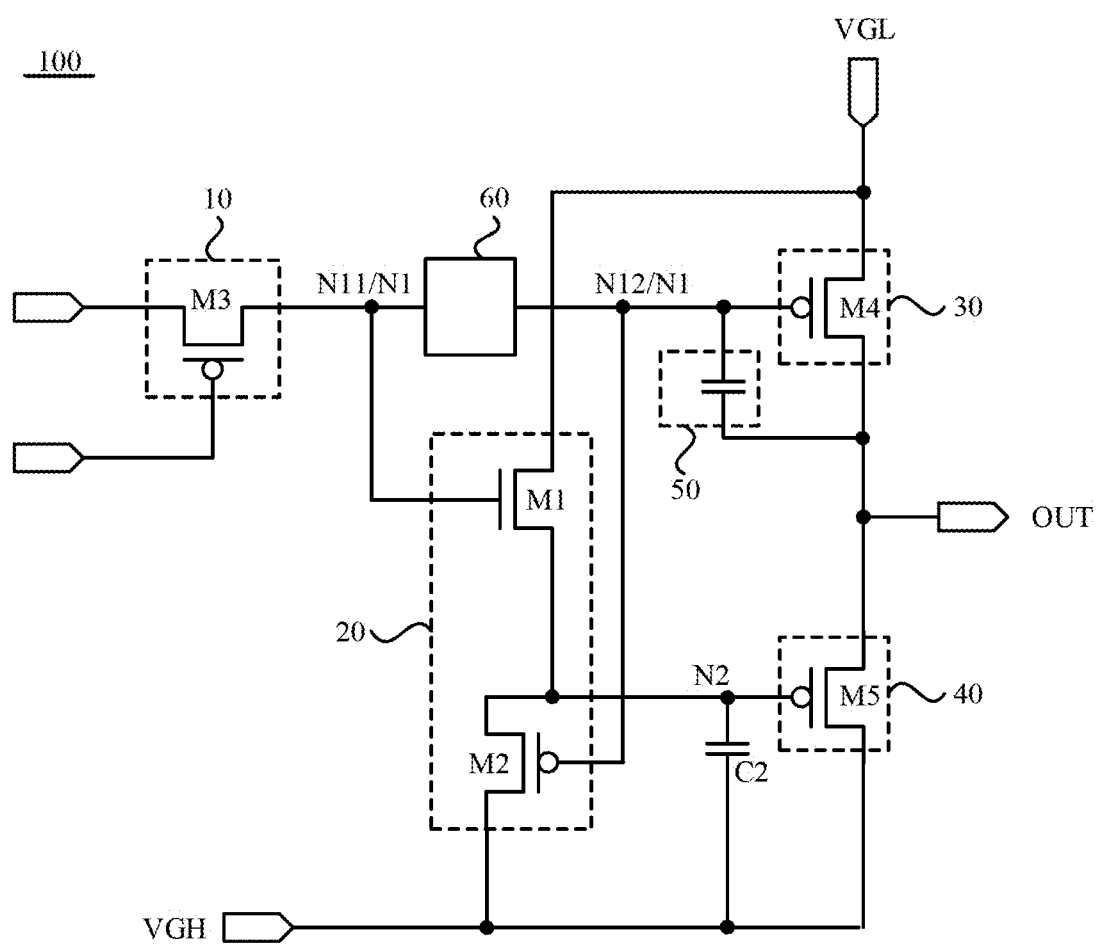
FIG. 16 is a diagram illustrating the structure of yet another shift register circuit according to embodiments of the present application.
Figure 17:
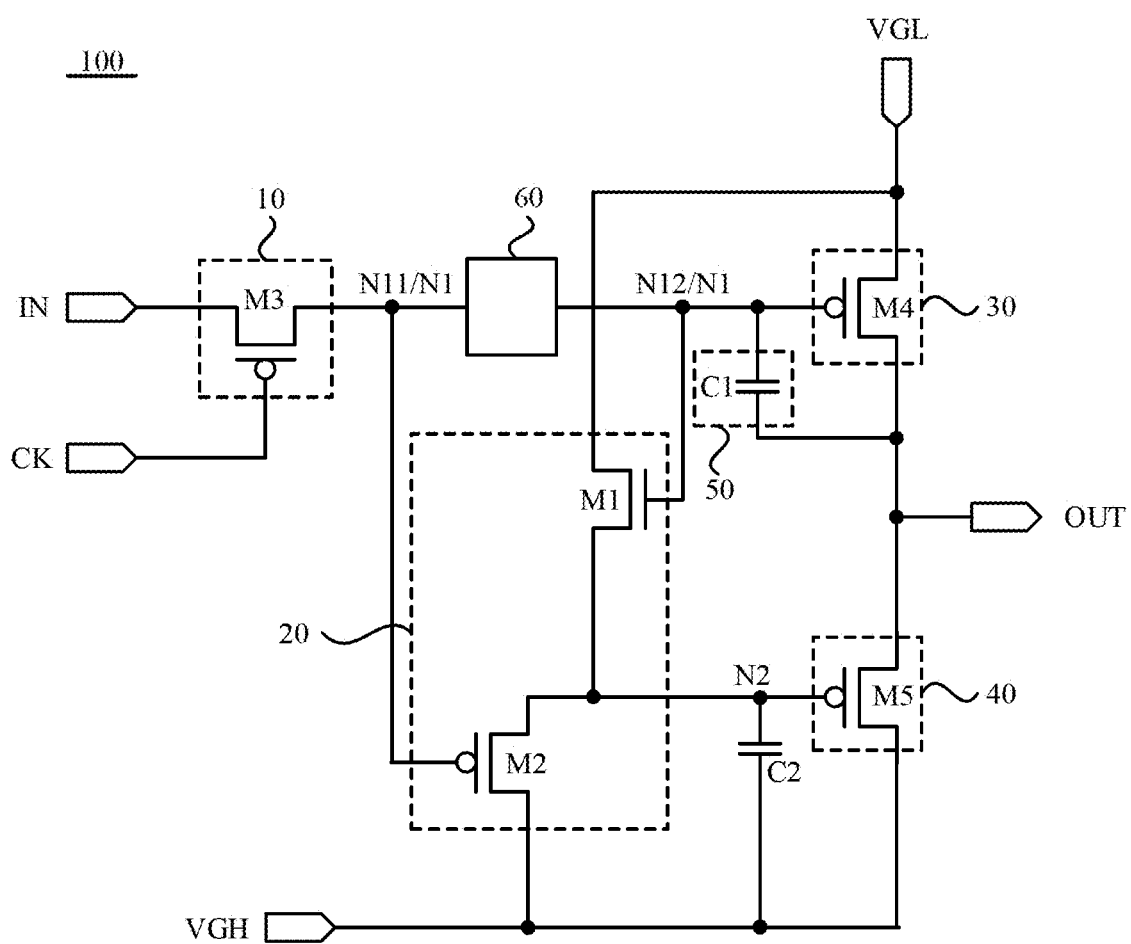
FIG. 17 is a diagram illustrating the structure of yet another shift register circuit according to embodiments of the present application.

In yet another optional embodiment, as shown in FIG. 16 or 17, one of the gate of the first transistor M1 or the gate of the second transistor M2 is electrically connected to the first sub-node N11 while the other one of the gate of the first transistor M1 or the gate of the second transistor M2 is electrically connected to the second sub-node N12.

Exemplarily, as shown in FIG. 16, the gate of the first transistor M1 is electrically connected to the first sub-node N11, and the second transistor M2 is electrically connected to the second sub-node N12, or as shown in FIG. 17, the gate of the first transistor M1 is electrically connected to the second sub-node N12, and the second transistor M2 is electrically connected to the first sub-node N11. In this way, the gate of the first transistor M1 and the gate of the second transistor M2 are electrically connected to the first sub-node N11 and the second sub-node N12 respectively so that the first sub-node N11 and the second sub-node N12 can be each electrically connected to fewer loads, and so that the potential of the first sub-node N11 and the potential of the second sub-node N12 can remain relatively stable, thereby improving the operation stability of the shift register circuit 100.

It is to be understood that the electrical connection manner of the first transistor M1 and the second transistor M2 to the first sub-node N11 and the second sub-node N12 may be designed according to actual needs and is not specifically limited in the embodiments of the present application. For ease of description, unless otherwise specified, the technical solutions of the embodiments of the present application are illustrated using an example in which the gate of the first transistor M1 is electrically connected to the second sub-node N12, and the second transistor M2 is electrically connected to the first sub-node N11 in the embodiments of the present application.

Optionally, with continued reference to FIG. 17, when the first output module 30 includes the first output transistor M4, the gate of the first output transistor M4 may be electrically connected to the second sub-node N12 in the first node N1, the first electrode of the first output transistor M4 is electrically connected to the first level terminal VGL, and the second electrode of the first output transistor M4 is electrically connected to the signal output terminal OUT. In this case, the potential VN12 of the second sub-node N12 can control the first output transistor M4 to be turned on or off.

Optionally, with continued reference to FIG. 17, when the first node N1 includes the first sub-node N11 and the second sub-node N12, and the voltage regulation module 60 is electrically connected between the first sub-node N11 and the second sub-node N12, the first output module 30 and the bootstrap module 50 are each electrically connected to the second sub-node N12 in the first node N1, and the first control module 10 is electrically connected to the first sub-node N11 in the first node N1. In this way, the first control module 10 can be isolated from the first output module 30 and the bootstrap module 50 through the voltage regulation module 60 to prevent the normal operation of the first control module 10 from being affected due to a relatively low potential VN12 of the second sub-node N12 caused by the action of the bootstrap module 50 so that the operation stability of the shift register circuit 100 can be improved.

Figure 18:
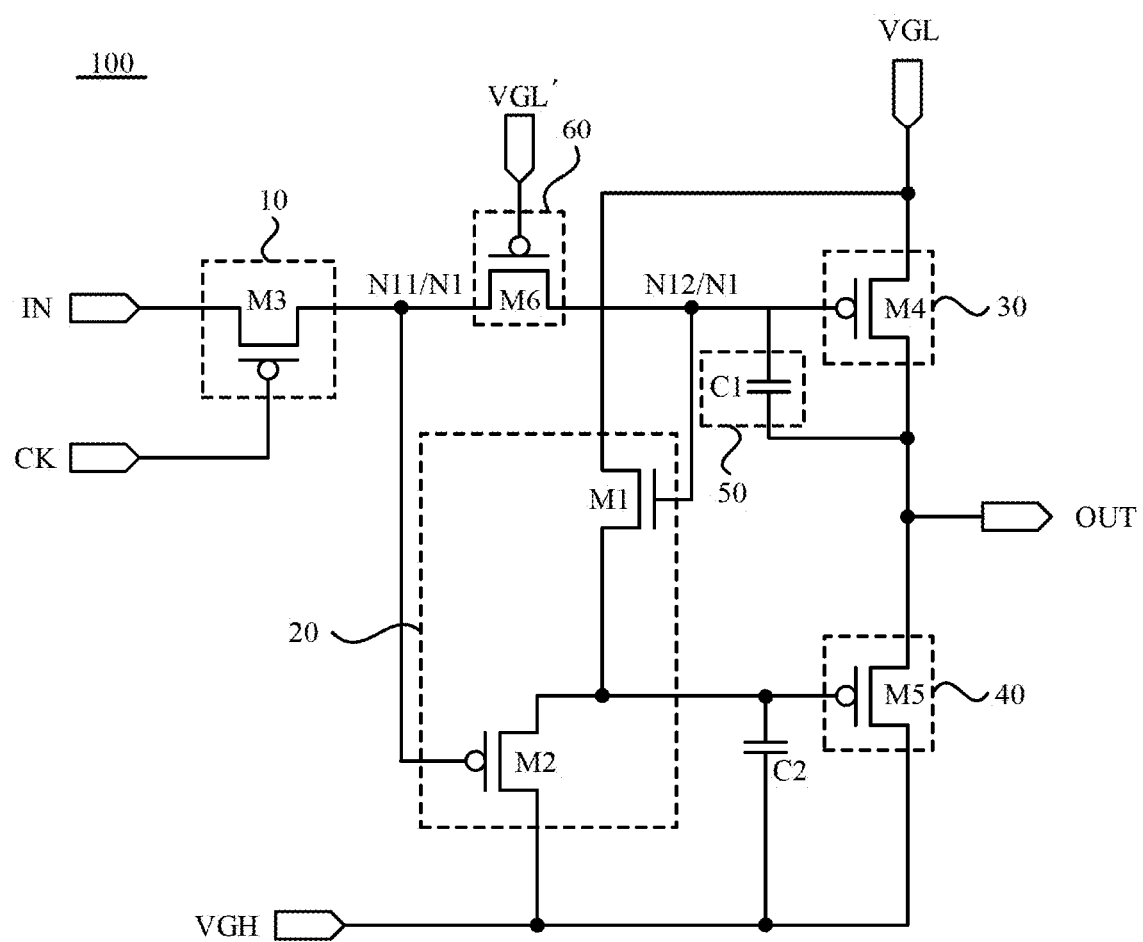
FIG. 18 is a diagram illustrating the structure of yet another shift register circuit according to embodiments of the present application.

Optionally, FIG. 18 is a diagram illustrating the structure of yet another shift register circuit according to embodiments of the present application. As shown in FIG. 18, the voltage regulation module 60 includes a voltage regulation transistor M6. The first electrode of the voltage regulation transistor M6 is electrically connected to the first sub-node N11, the second electrode of the voltage regulation transistor M6 is electrically connected to the second sub-node N12, and the gate of the voltage regulation transistor M6 is electrically connected to a third level terminal VGL'. When the potential of the first sub-node N11 and the potential of the second sub-node N12 are within a preset range, a third level signal Vgl' of the third level terminal VGL' controls the voltage regulation transistor M6 to be in a conduction state.

In an embodiment, when the potential of the first sub-node N11 and the potential of the second sub-node N12 are within the preset range, the third level signal Vgl' of the third level terminal VGL' controls the voltage regulation transistor M6 to be in an on state so that the potential of the first sub-node N11 and the potential of the second sub-node N12 can remain consistent basically. When any one of the potential of the first sub-node N11 or the potential of the second sub-node N12 exceeds the preset range, for example, the potential of the second sub-node N12 is greatly low or greatly high, the voltage regulation transistor M6 may be in an off state to enable the potential VN12 of the second sub-node N12 not to affect the potential of the first sub-node N11 so that the potential of the first sub-node N11 can remain in the original state, preventing the normal operation of the first control module 10 electrically connected to the first sub-node N11 from being affected by a change in the potential of the first sub-node N11. Conversely, when the potential of the first sub-node N11 is greatly low or greatly high, the potential of the second sub-node N12 can be ensured to be stable by making the voltage regulation transistor M6 in an off state so that the first output module 30 electrically connected to the second sub-node N12 can operate normally, and the accuracy and stability of the gate drive signal Gout output by the signal output terminal OUT can be ensured.

When the first output module 30 includes the first output transistor M4, the voltage regulation transistor M6 and the first output transistor M4 have the same channel type, that is, both the voltage regulation transistor M6 and the first output transistor M4 are n-type transistors or both of them are p-type transistors.

In an optional embodiment, the third level signal of the third level terminal VGL' is denoted as Vgl', and the first level signal of the first level terminal VGL is denoted as Vgl, where [Vgl|>|Vgl'], or Vgl=Vgl'.

In an exemplary embodiment, that the first output transistor M4 and the voltage regulation transistor M6 are each a p-type transistor is used as an example. When the first output transistor M4 transmits the first level signal Vgl to the signal output terminal OUT, and the signal of the signal output terminal OUT hops from being at a high level to being at a low level, the second sub-node N12 also hops due to the presence of the bootstrap module 50 so that the second sub-node N12 can have a relatively low potential. In this case, since the first level signal Vgl of the first level terminal VGL electrically connected to the first output transistor M4 is at a low level, and the first level signal Vgl is generally negative, similarly, the third level signal Vgl' of the third level terminal VGL' electrically connected to the voltage regulation transistor M6 is also negative. Therefore, when |Vgl|>|Vgl'|, that is, Vgl<Vgl', and the potential of the second sub-node N12 hops to be at a lower potential due to a change in the signal output terminal OUT, the voltage regulation transistor M6, under the control of the third level signal Vgl', can prevent the transmission of the signal of the first sub-node N11 to the second sub-node N12, ensure the second sub-node N12 to be sufficiently low and thereby control the first output transistor M4 to be in a normal conduction state so that the first level signal Vgl can be transmitted to the signal output terminal OUT quickly, and the accuracy and stability of the gate drive signal output by the signal output terminal OUT can be ensured.

In another exemplary embodiment, when Vgl=Vgl', the third level signal Vgl' of the third level terminal VGL' is the same as the first level signal Vgl of the first level terminal VGL so that the first level terminal VGL can also serve as the third level terminal VGL', thereby reducing the number of signal terminals in the shift register circuit, simplifying the structure of the shift register circuit and reducing the size of the shift register circuit.

Figure 19:
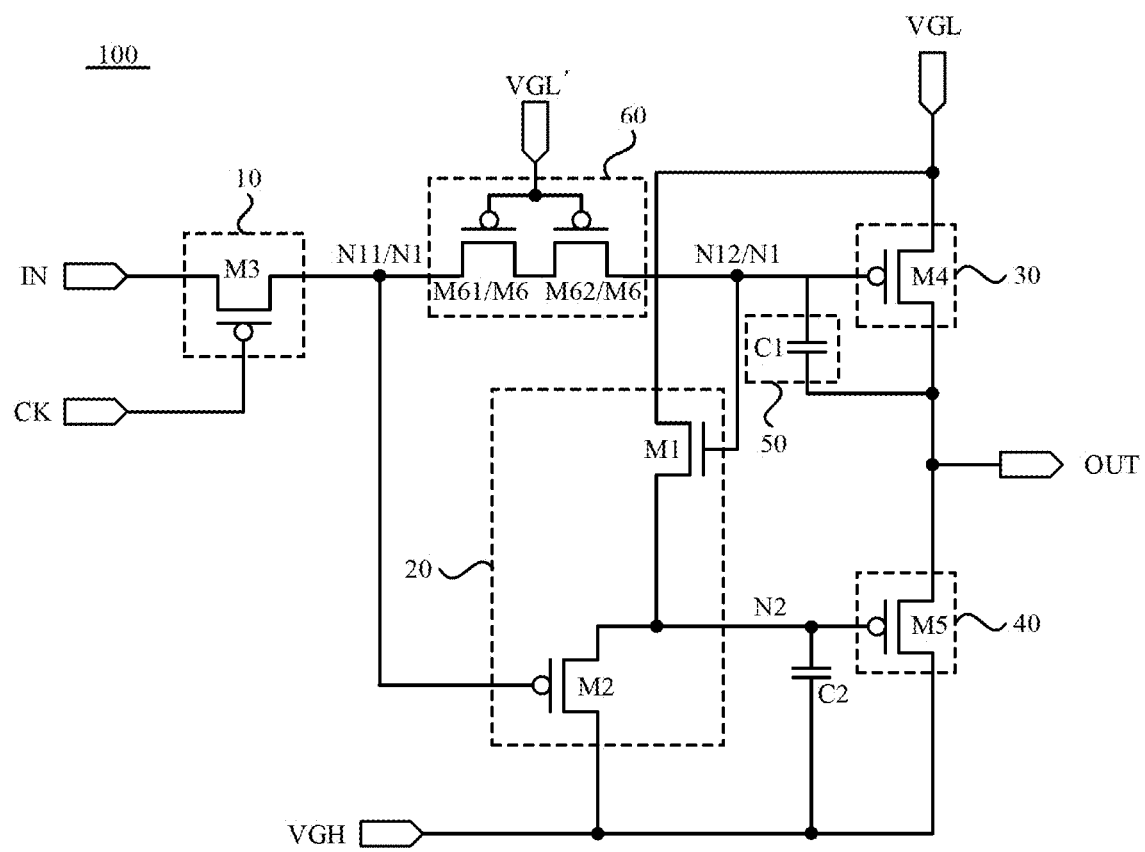
FIG. 19 is a diagram illustrating the structure of yet another shift register circuit according to embodiments of the present application.

Optionally, FIG. 19 is a diagram illustrating the structure of yet another shift register circuit according to embodiments of the present application. As shown in FIG. 19, when the voltage regulation module 60 includes the voltage regulation transistor M6, the voltage regulation transistor M6 includes a third sub-transistor M61 and a fourth sub-transistor M62. The gate of the third sub-transistor M61 and the gate of the fourth sub-transistor M62 are each electrically connected to the third level terminal VGL', the first electrode of the third sub-transistor M61 is electrically connected to the first sub-node N11, the second electrode of the third sub-transistor M61 is electrically connected to the first electrode of the fourth sub-transistor M62, and the second electrode of the fourth sub-transistor M62 is electrically connected to the second sub-node N12. When the potential of the first sub-node N11 and the potential of the second sub-node N12 are each within the preset range, the third level signal Vgl' of the third level terminal VGL' controls the third sub-transistor M61 and the fourth sub-transistor M62 each to be in an on state.

In an embodiment, the gate of the third sub-transistor M61 and the gate of the fourth sub-transistor M62 are each electrically connected to the third level terminal VGL' so that the third level signal Vgl' of the third level terminal VGL' can control the third sub-transistor M61 and the fourth sub-transistor M62 to synchronously turn on or off. In this case, the voltage regulation transistor M6 is a double-gate transistor composed of the third sub-transistor M61 and the fourth sub-transistor M62. When the potential of the first sub-node N11 and the potential of the second sub-node N12 are each within the preset range, the third level signal Vgl' controls the third sub-transistor M61 and the fourth sub-transistor M62 to synchronously turn on so that the voltage regulation transistor M6 can have a relatively high mobility, relatively large on-state current, relatively small subthreshold swing and relatively stable threshold voltage, and so that a signal can be transmitted between the first sub-node N11 and the second sub-node N12 quickly and stably, and so that the potential of the first sub-node N11 and the potential of the second sub-node N12 can remain consistent, improving the stability of the potential of the first sub-node N11 and the potential of the second sub-node N12.

Figure 20:
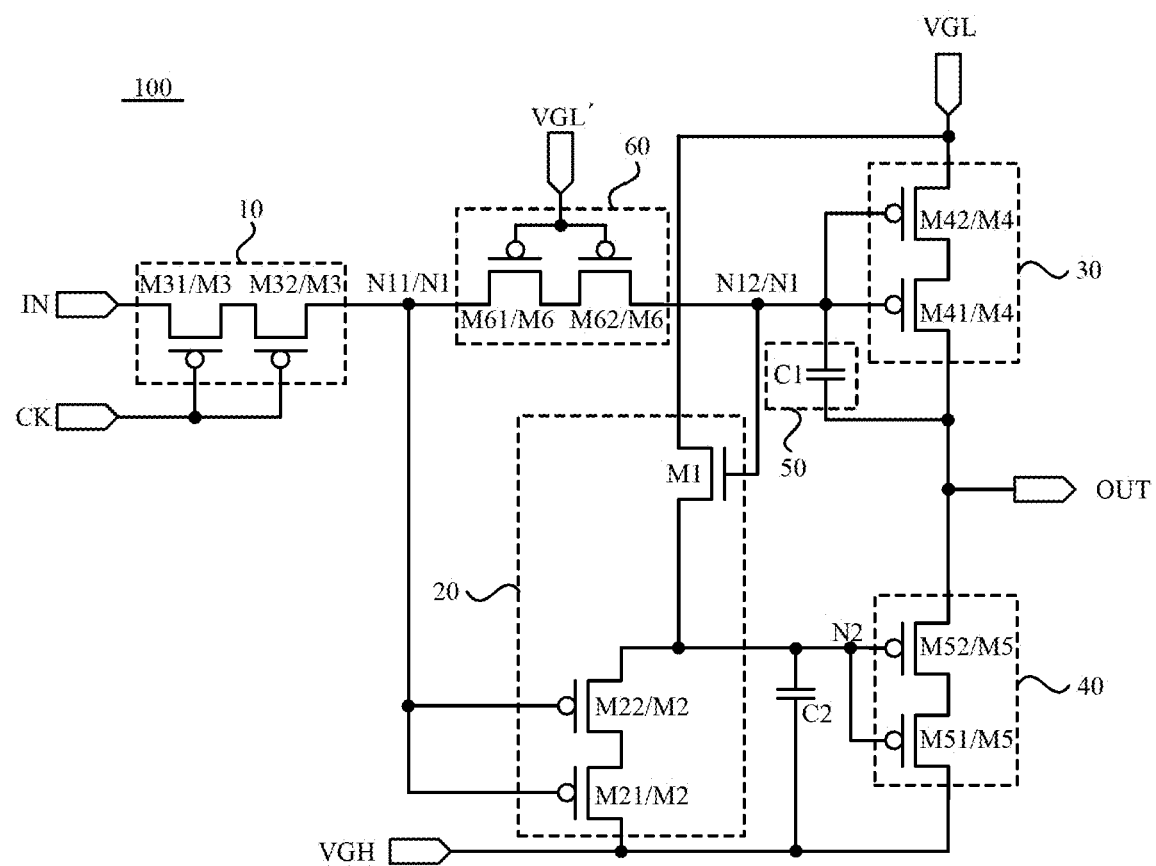
FIG. 20 is a diagram illustrating the structure of yet another shift register circuit according to embodiments of the present application.

Based on the preceding embodiments, as shown in FIG. 20, the first output transistor M4 and the second output transistor M5 may also be each a double-gate transistor. In this case, the first output transistor M4 may include a seventh sub-transistor M41 and an eighth sub-transistor M42, and the second output transistor M5 may include a ninth sub-transistor M51 and a tenth sub-transistor M52. The gate of the seventh sub-transistor M41 and the gate of the eighth sub-transistor M42 are each electrically connected to the second sub-node N12, the first electrode of the seventh sub-transistor M41 is electrically connected to the first level terminal VGL, the second electrode of the seventh sub-transistor M41 is electrically connected to the first electrode of the eighth sub-transistor M42, and the second electrode of the eighth sub-transistor M42 is electrically connected to the signal output terminal OUT. The gate of the ninth sub-transistor M51 and the gate of the tenth sub-transistor M52 are each electrically connected to the second node N2, the first electrode of the ninth sub-transistor M51 is electrically connected to the second level terminal VGH, the second electrode of the ninth sub-transistor M51 is electrically connected to the first electrode of the tenth sub-transistor M52, and the second electrode of the tenth sub-transistor M52 is electrically connected to the signal output terminal OUT.

In this way, the potential VN12 of the second sub-node N12 can control the seventh sub-transistor M41 and the eighth sub-transistor M42 to synchronously turn on or off so that the first output transistor M4 composed of the seventh sub-transistor M41 and the eighth sub-transistor M42 can have a relatively high on-state current and relatively low off-state leakage current. Similarly, the potential VN2 of the second node N2 can control the ninth sub-transistor M51 and the tenth sub-transistor M52 to synchronously turn on or off so that the second output transistor M5 composed of the ninth sub-transistor M51 and the tenth sub-transistor M52 can have a relatively high on-state current and relatively low off-state leakage current.

It is to be noted that the preceding is a merely exemplary illustration of the shift register circuit of the embodiments of the present application. The specific structure of the shift register circuit is not limited in the embodiments of the present application on the premise that the shift register circuit provided by the embodiments of the present application can have a relatively small size and relatively high output stability and stability.

Based on the same inventive concept, embodiments of the present application further provide a shift register. The shift register includes multiple shift register circuits provided by the embodiments of the present application and arranged in a cascade manner, so the shift register has the technical features of the shift register circuit provided by the embodiments of the present application and can achieve the beneficial effects of the shift register circuit provided by the embodiments of the present application. For similarities, reference can be made to the preceding description, and details are not repeated herein.

Figure 21:
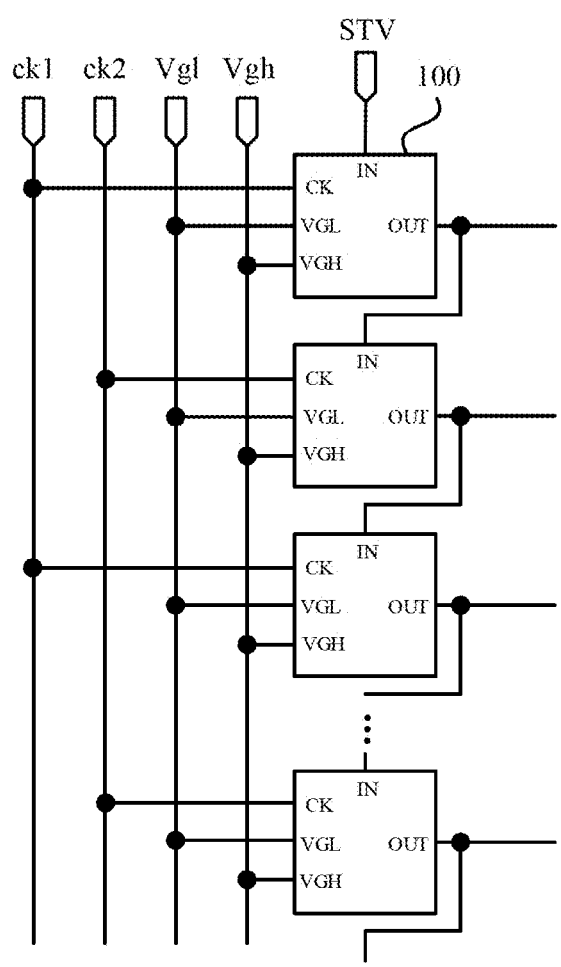
FIG. 21 is a diagram illustrating the structure of a shift register according to embodiments of the present application.
Figure 22:
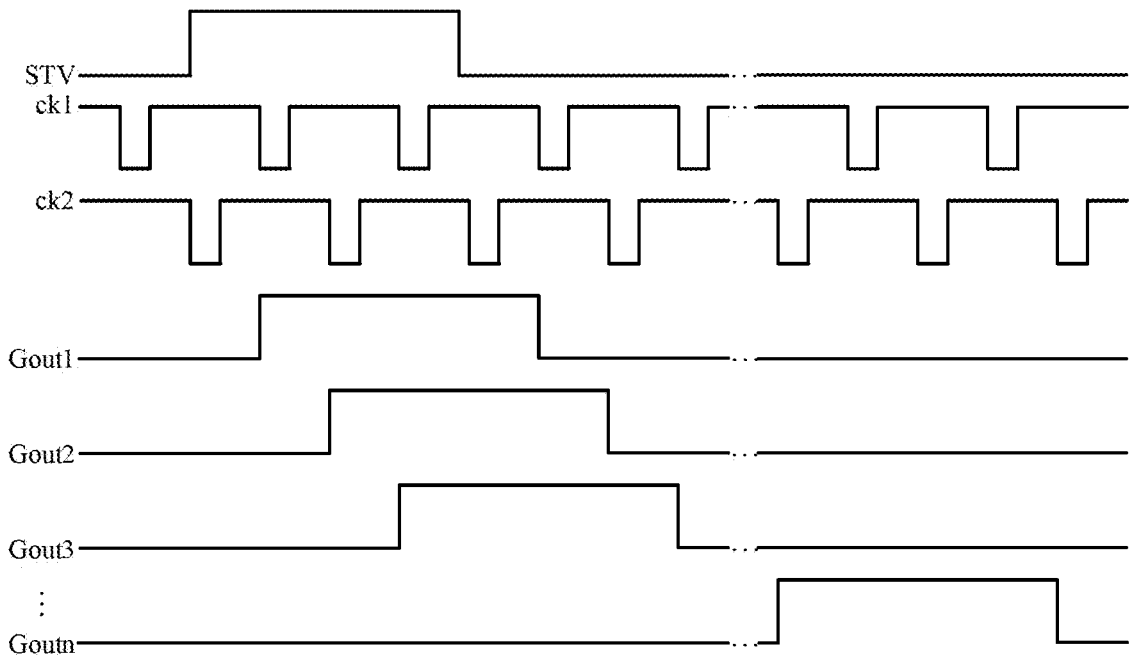
FIG. 22 is a drive timing diagram of a shift register according to embodiments of the present application.

FIG. 21 is a diagram illustrating the structure of a shift register according to embodiments of the present application. FIG. 22 is a drive timing diagram of a shift register according to embodiments of the present application. In conjunction with FIGS. 21 and 22, among the multiple shift register circuits 100 arranged in a cascade manner, the signal output terminal OUT of the previous-stage shift register circuit 100 is electrically connected to the signal input terminal IN of the subsequent-stage shift register circuit 100, the signal input terminal of the first-stage shift register circuit 100 receives a start signal STV, a clock signal of the clock signal terminal CK of an odd number-stage shift register circuit 100 is denoted as a first clock signal ck1, a clock signal of the clock signal terminal CK of an even number-stage shift register circuit 100 is denoted as a second clock signal ck2, the first clock signal ck1 and the second clock signal ck2 have the same clock cycle, and in one clock cycle T, the effective pulse of the first clock signal ck1 and the effective pulse of the second clock signal ck2 are sequentially shifted. In this way, gate drive signals (Gout1, Gout2, Gout3, . . . , Goutn) output by signal output terminals OUT of the multiple shift register circuits arranged in a cascade manner can be sequentially shifted so that the shift register can scan rows of pixels in the display panel row by row when being applied to the display panel.

Based on the same inventive concept, embodiments of the present application further provide a display panel. The display panel includes the shift register provided by the embodiments of the present application, so the display panel has the technical features of the shift register provided by the embodiments of the present application and can achieve the beneficial effects of the shift register provided by the embodiments of the present application. For the same points, references can be made to the preceding description, and details are not repeated herein.

Figure 23:
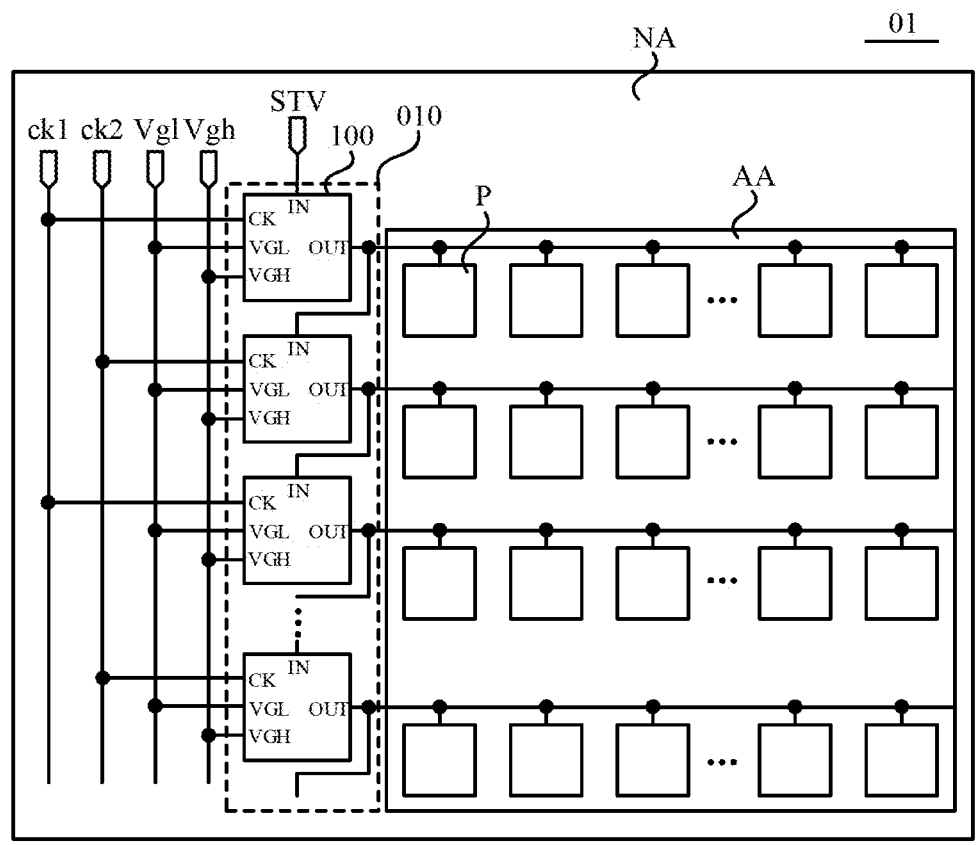
FIG. 23 is a diagram illustrating the structure of a display panel according to embodiments of the present application.

In an exemplary embodiment, FIG. 23 is a diagram illustrating the structure of a display panel according to embodiments of the present application. As shown in FIG. 23, the display panel 01 includes a display region AA and a non-display region NA. The shift register 010 is located in the non-display region NA. The display region AA is provided with multiple pixels P arranged in an array. At least part of the same row of pixels P are electrically connected to the signal output terminal OUT of the same one shift register circuit 100 in the shift register 010 to receive the gate drive signal output by the same one shift register circuit 100 so that the gate drive signal can control transistors in the at least part of the same row of pixels P to be turned on or off, thereby controlling the display light emission of the at least part of the same row of pixels P.

It is to be understood that the display panel 01 may be a self-luminous display panel or a non-self-luminous display panel. When the display panel 01 is a non-self-luminous display panel, the display panel 01 may be, for example, a liquid crystal display panel. In this case, the gate drive signals output by the multiple shift register circuits 100 can control transistors in the multiple pixels P to be turned on or off to control the transmission paths of data signals to pixel electrodes in the multiple pixels P. When the display panel 01 is a self-luminous display panel, each pixel P of the display panel 01 may include a light-emitting element and a pixel circuit for driving the light-emitting element to emit light. The pixel circuit may be composed of components such as multiple transistors and capacitances. In this case, each gate drive signal output by each shift register circuit 100 may control any one or more transistors in the pixel circuit to be turned on or off.

Figure 24:
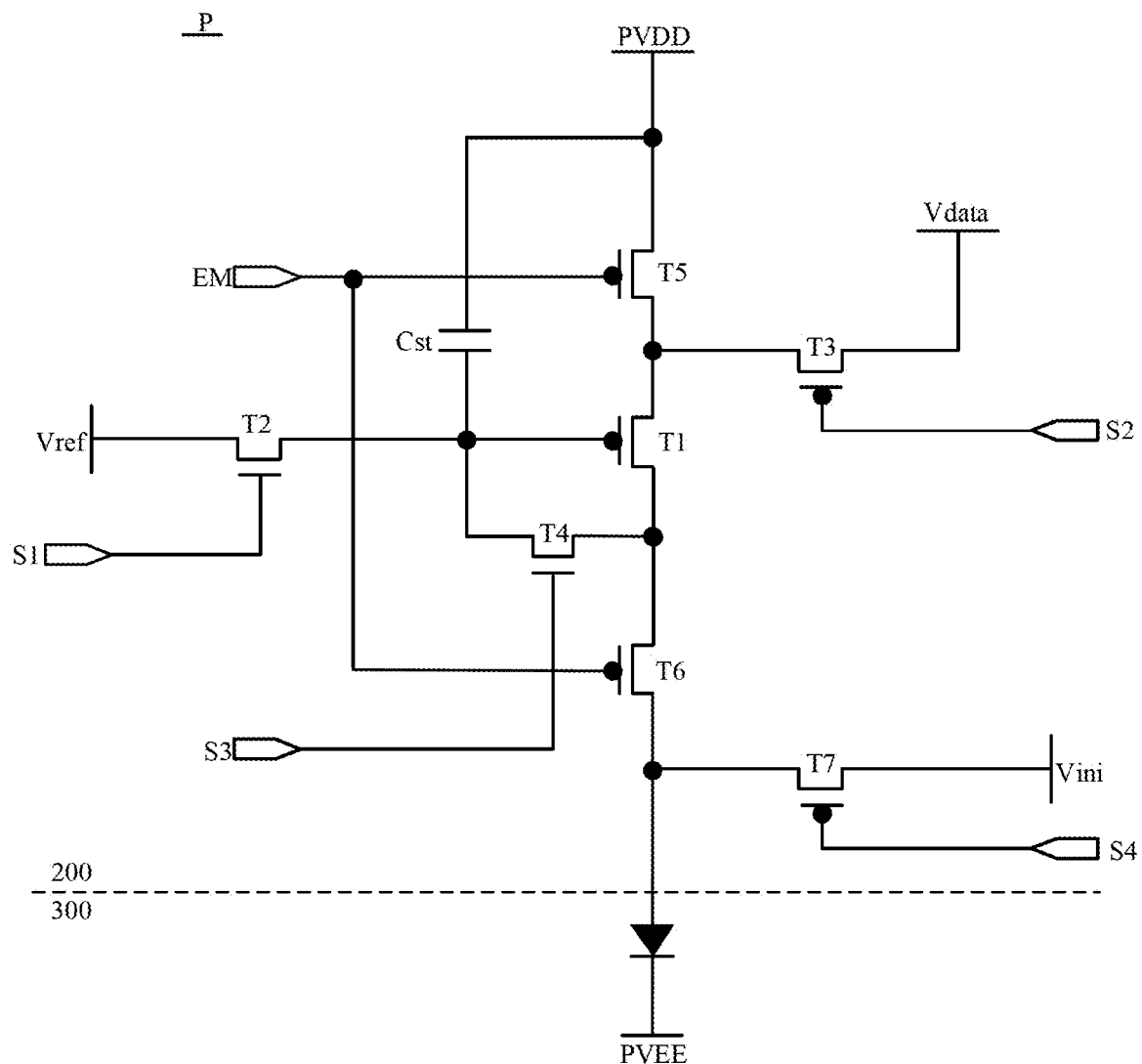
FIG. 24 is a diagram illustrating the structure of a pixel in a display panel according to embodiments of the present application.

Exemplarily, as shown in FIG. 24, each pixel P of the display panel may include a light-emitting element 300 and a pixel circuit 200. The pixel circuit 200 may be a 7T1C pixel circuit, that is, the pixel circuit 200 may include seven transistors and a storage capacitance Cst. The storage capacitance Cst may store the potential of the gate of a drive transistor T1 to ensure the stability of the potential of the gate of the drive transistor T1. The seven transistors are the drive transistor T1, an initialization transistor T2, a data write transistor T3, a compensation transistor T4, a first light emission control transistor T5, a second light emission control transistor T6 and a reset transistor T7 respectively. The initialization transistor T2 may be controlled by a first scan signal S1 to be turned on or off, and when the initialization transistor T2 is turned on, an initialization signal Vref may be transmitted to the gate of the drive transistor T1 to initialize the drive transistor T1. The data write transistor T3 may be controlled by a second scan signal S2 to be turned on or off, and the compensation transistor T4 may be controlled by a third scan signal S3 to be turned on or off, and when the data write transistor T3 and the compensation transistor T4 are turned on simultaneously, a data signal Vdata may be transmitted to the gate of the drive transistor T1, and a threshold voltage Vth of the drive transistor T1 can be compensated to the gate of the drive transistor T1 while the data signal Vdata is transmitted so that the potential of the gate of the drive transistor T1 can be the sum of the threshold voltage Vth and the voltage of the data signal Vdata. Therefore, in the subsequent light emission stage, the drive transistor T1 can be independent of the threshold voltage of the drive transistor T1 according to a driving circuit provided for the potential of the gate of the drive transistor T1 so that the accuracy of a drive current provided by the drive transistor T1 can be ensured. The first light emission control transistor T5 and the second light emission control transistor T6 may be controlled by a light emission control signal EM to be turned on or off, and when the first light emission control transistor T5 and the second light emission control transistor T6 are turned on, a current path is formed from a positive power signal PVDD to a negative power signal PVEE so that the drive transistor T1 can generate a drive current that is supplied to the light-emitting element 300 to drive the light-emitting element 300 to emit light. The reset transistor T7 may be controlled by a fourth scan signal S4 to be turned on or off, and when the fourth scan signal S4 controls the reset transistor T7 to be turned on, a reset signal Vini can be transmitted to the anode of the light-emitting element 300 to reset the light-emitting element 300.

Types of the transistors in the pixel circuit 200 may be designed according to actual needs and are not specifically limited in the embodiments of the present application. In an exemplary embodiment, the initialization transistor T2 and the compensation transistor T4 may be each an n-type transistor to reduce the leakage current and ensure the stability of the potential of the gate of the drive transistor T1 when the initialization transistor T2 and the compensation transistor T4 are in an off state, and the drive transistor T1, the data write transistor T3, the first light emission control transistor T5, the second light emission control transistor T6 and the reset transistor T7 may be each a p-type transistor to ensure the accuracy of signal transmission.

The gate drive signal output by the shift register circuit 100 may be any one of the first scan signal S1, the second scan signal S2, the third scan signal S3, the fourth scan signal S4, or the light emission control signal EM. In an optional embodiment, the gate drive signal output by the shift register circuit may be a scan signal (such as the first scan signal S1 or the third scan signal S3) controlling an n-type transistor (such as the initialization transistor T2 or the compensation transistor T4) or may also be the light emission control signal EM controlling a light emission control transistor (such as the first light emission control transistor T5 or the second light emission control transistor T6).

Figure 25:
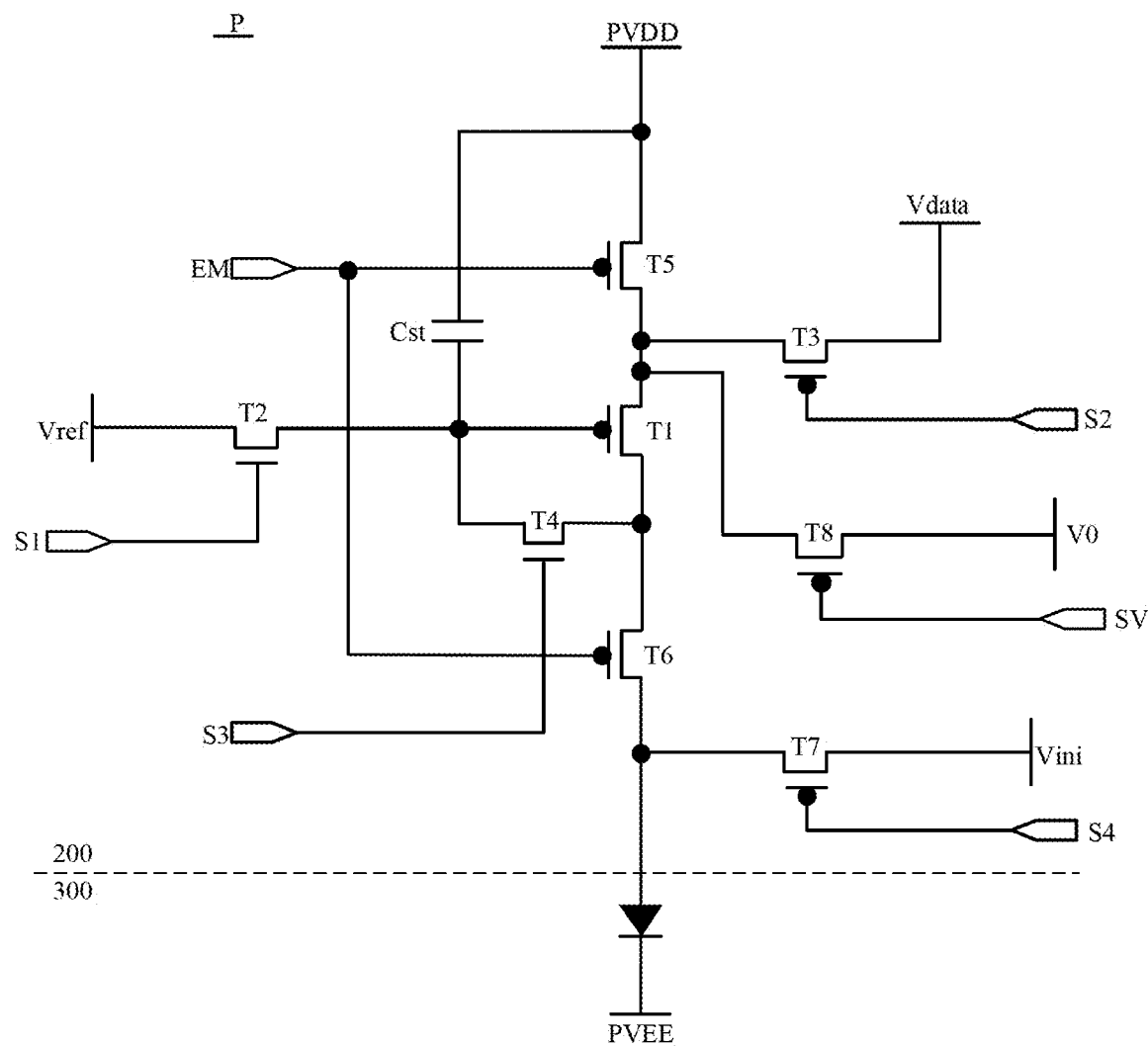
FIG. 25 is a diagram illustrating the structure of a pixel in another display panel according to embodiments of the present application.

It is to be noted that FIG. 24 is merely an exemplary drawing of the embodiments of the present application, and the pixel circuit mentioned in the embodiments of the present application is not limited herein. For example, as shown in FIG. 25, the pixel circuit 200 may further be an 8TIC pixel circuit. The 8TIC pixel circuit may be added with a bias adjustment transistor T8 based on the 7TIC pixel circuit. The bias adjustment transistor T8 may transmit a bias adjustment signal V0 to the source and/or drain of the drive transistor T1 under the control of a bias adjustment control signal SV to perform bias adjustment on the drive transistor T1. In this case, the gate drive signal output by the shift register circuit may also be the bias adjustment control signal.

It is to be understood that the specific implementation principles of the 7TIC or 8TIC pixel circuit may refer to the description in the related art, and details are not repeated herein. The pixel circuits as shown in FIGS. 24 and 25 are merely exemplary pixel circuit structures. The pixel circuit mentioned in the embodiments of the present application may be designed according to actual needs and is not described herein.

Based on the same inventive concept, embodiments of the present application further provide a display device including the display panel provided by the embodiments of the present application. Therefore, the display device has the technical features of the display panel provided by the embodiments of the present application and can achieve the beneficial effects of the display panel provided by the embodiments of the present application. For similarities, references can be made to the preceding description of the display panel provided by the embodiments of the present application, and details are not repeated herein.

Figure 26:
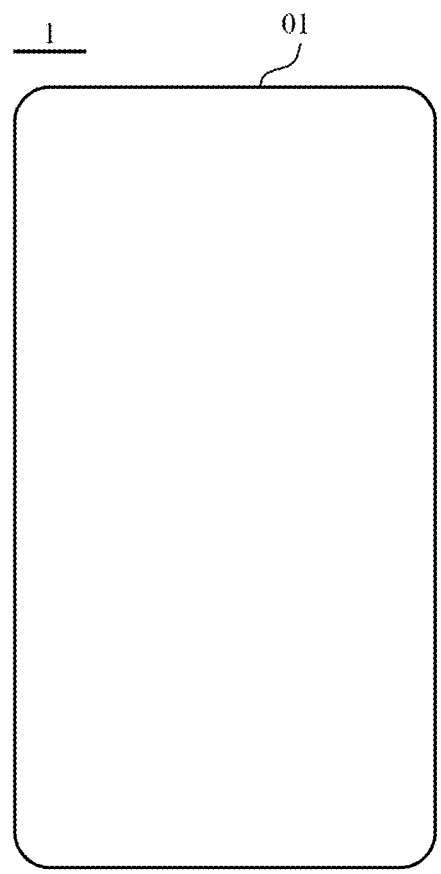
FIG. 26 is a diagram illustrating the structure of a display device according to embodiments of the present application.

Exemplarily, FIG. 26 is a diagram illustrating the structure of a display device according to embodiments of the present application. As shown in FIG. 26, the display device 1 includes the display panel 01 provided by the embodiments of the present application. The display device 1 provided by the embodiments of the present application may be any electronic product having a display function, including, but not limited to, the following categories: a phone, a television, a laptop, a desktop display, a tablet computer, a digital camera, a smart bracelet, smart glasses, a vehicle-mounted display, medical equipment, industrial control equipment, or a touch interactive terminal. This is not specially limited in the embodiments of the present application.

It is to be understood that various forms of the operation process of each pixel circuit shown in the preceding may be adopted with stages reordered, added, or deleted. For example, stages in the operation process of the each pixel circuit recorded in the present application may be performed in parallel, sequentially, or in different orders, as long as the desired results of the technical solutions of the present application can be achieved, and no limitation is imposed herein.

The preceding embodiments do not limit the scope of the present application. It is to be understood by those skilled in the art that various modifications, combinations, sub-combinations and substitutions may be made according to design requirements and other factors. Any modification, equivalent substitution, improvement, or the like made within the spirit and principle of the present application is within the scope of the present application.

What is claimed is:
1. A shift register circuit, comprising:
a first control module, wherein the first control module is electrically connected to a signal input terminal, a clock signal terminal and a first node separately and is configured to control a potential of the first node in response to an input signal of the signal input terminal and a clock signal of the clock signal terminal;
a first output module, wherein the first output module is electrically connected to the first node, a first level terminal and a signal output terminal separately and is configured to control a transmission path of a first level signal of the first level terminal to the signal output terminal in response to the potential of the first node;

a second control module, wherein the second control module is electrically connected to the first level terminal, a second level terminal, the first node and a second node separately and is configured to control a second level signal of the second level terminal to be transmitted to the second node when the first level signal of the first level terminal is transmitted to the signal output terminal and control the first level signal of the first level terminal to be transmitted to the second node when the first level signal of the first level terminal stops being transmitted to the signal output terminal; and a second output module, wherein the second output module is electrically connected to the second node, the second level terminal and the signal output terminal separately and is configured to control a transmission path of the second level signal of the second level terminal to the signal output terminal in response to a potential of the second node; and the circuit further comprising: a base substrate, a first semiconductor layer and a second semiconductor layer that are located on one side of the base substrate, a first conductive layer located on one side of the first semiconductor layer facing away from the base substrate, a first metal layer located between the first conductive layer and the second semiconductor layer;

wherein the first metal layer comprises a fixed signal transmission line and a first light-shielding structure that are disposed in a same layer, the first light-shielding structure overlaps the first active layer in a direction perpendicular to a plane on which the base substrate is located, and the fixed signal transmission line is configured to transmit the first level signal or the second level signal.

2. The shift register circuit according to claim 1, wherein the second control module comprises a first transistor and a second transistor, wherein a gate of the first transistor and a gate of the second transistor are each electrically connected to the first node, a first electrode of the first transistor is electrically connected to the first level terminal, a second terminal of the first transistor is electrically connected to the second node, a first electrode of the second transistor is electrically connected to the second level terminal, and a second terminal of the second transistor is electrically connected to the second node, wherein the first transistor and the second transistor have different channel types.

3. The shift register circuit according to claim 2, wherein the first semiconductor layer comprises a first active layer, the second semiconductor layer comprises a second active layer, and the first semiconductor layer and the second semiconductor layer are made of different materials, and one of the first active layer or the second active layer serves as an active layer of the first transistor while the other one of the first active layer or the second active layer serves as an active layer of the second transistor.

4. The shift register circuit according to claim 2, wherein one of the first transistor or the second transistor is a p-type transistor, and the p-type transistor comprises a first sub-transistor and a second sub-transistor, wherein a gate of the first sub-transistor and a gate of the second sub-transistor are each electrically connected to the first node, a first electrode of the first sub-transistor serves as a first electrode of the p-type transistor, a second electrode of the first sub-transistor is electrically connected to a first electrode of the second sub-transistor, and a second electrode of the second sub-transistor serves as a second electrode of the p-type transistor.

5. The shift register circuit according to claim 2, wherein the first node comprises a first sub-node and a second sub-node, the shift register circuit further comprises a voltage regulation module, and the voltage regulation module is electrically connected between the first sub-node and the second sub-node and is configured to regulate a potential of the first sub-node and a potential of the second sub-node; and the gate of the first transistor and the gate of the second transistor are each electrically connected to one of the first sub-node or the second sub-node, or one of the gate of the first transistor or the gate of the second transistor is electrically connected to the first sub-node while the other one of the gate of the first transistor or the gate of the second transistor is electrically connected to the second sub-node.

6. The shift register circuit according to claim 5, wherein the first output module comprises a first output transistor, a gate of the first output transistor is electrically connected to the second sub-node of the first node, a first electrode of the first output transistor is electrically connected to the first level terminal, and a second electrode of the first output transistor is electrically connected to the signal output terminal, wherein the first output transistor and the first transistor have different channel types.

7. The shift register circuit according to claim 6, wherein the voltage regulation module comprises a voltage regulation transistor, a first electrode of the voltage regulation transistor is electrically connected to the first sub-node, a second electrode of the voltage regulation transistor is electrically connected to the second sub-node, and a gate of the voltage regulation transistor is electrically connected to a third level terminal, wherein when the potential of the first sub-node and the potential of the second sub-node are within a preset range, a third level signal of the third level terminal controls the voltage regulation transistor to be in an on state.

8. The shift register circuit according to claim 7, wherein the voltage regulation transistor and the first output transistor have a same channel type; and the third level signal is denoted as Vgl', and the first level signal is denoted as Vgl, wherein $|Vgl|>|Vgl'|$, or $Vgl=Vgl'$.

9. The shift register circuit according to claim 1, wherein at least part of the fixed signal transmission line also serves as at least part of the first light-shielding structure.

10. The shift register circuit according to claim 1, further comprising:

a bootstrap module, wherein the bootstrap module is electrically connected between the first node and the signal output terminal and is configured to control the potential of the first node and the potential of the signal output terminal to have a same variation.

11. The shift register circuit according to claim 10, wherein the bootstrap module comprises a bootstrap capacitance, wherein a first plate of the bootstrap capacitance is electrically connected to the first node, and a second plate of the bootstrap capacitance is electrically connected to the signal output terminal.

12. The shift register circuit according to claim 10, wherein the first node comprises a first sub-node and a second sub-node,
the shift register circuit further comprises a voltage regulation module, and the voltage regulation module is electrically connected between the first sub-node and the second sub-node and is configured to regulate a potential of the first sub-node and a potential of the second sub-node; and
the first output module and the bootstrap module are each electrically connected to the second sub-node of the first node, and the first control module is electrically connected to the first sub-node of the first node.

13. The shift register circuit according to claim 12, wherein the voltage regulation module comprises a voltage regulation transistor, and the voltage regulation transistor comprises a third sub-transistor and a fourth sub-transistor, wherein
a gate of the third sub-transistor and a gate of the fourth sub-transistor are each electrically connected to a third level terminal, a first electrode of the third sub-transistor is electrically connected to the first sub-node, a second electrode of the third sub-transistor is electrically connected to a first electrode of the fourth sub-transistor, and a second electrode of the fourth sub-transistor is electrically connected to the second sub-node,
wherein when the potential of the first sub-node and the potential of the second sub-node are within a preset range, a third level signal of the third level terminal controls the third sub-transistor and the fourth sub-transistor to be in an on state.

14. The shift register circuit according to claim 1, wherein the first control module comprises a third transistor, wherein a gate of the third transistor is electrically connected to the clock signal terminal, a first electrode of the third transistor is electrically connected to the signal input terminal, and a second electrode of the third transistor is electrically connected to the first node.

15. The shift register circuit according to claim 14, wherein the third transistor comprises a fifth sub-transistor and a sixth sub-transistor, wherein
a gate of the fifth sub-transistor and a gate of the sixth sub-transistor are each electrically connected to the clock signal terminal, a first electrode of the fifth sub-transistor is electrically connected to the signal input terminal, a second electrode of the fifth sub-transistor is electrically connected to a first electrode of the sixth sub-transistor, and a second electrode of the sixth sub-transistor is electrically connected to the first node.

16. The shift register circuit according to claim 14, wherein the first semiconductor layer comprises a third active layer, and the third active layer is an active layer of the third transistor; and
a second light-shielding structure located on one side of the first semiconductor layer facing away from the base substrate, wherein the second light-shielding structure overlaps the third active layer in a direction perpendicular to a plane on which the base substrate is located.

17. A shift register, comprising a plurality of shift register circuits arranged in a cascade manner,
wherein among the plurality of shift register circuits, a signal output terminal of a previous-stage shift register circuit is electrically connected to a signal input terminal of a subsequent-stage shift register circuit, and a signal input terminal of a first-stage shift register circuit receives a start signal;
a clock signal of a clock signal terminal of an odd number-stage shift register circuit is denoted as a first clock signal, and a clock signal of a clock signal terminal of an even number-stage shift register circuit is denoted as a second clock signal; and
the first clock signal and the second clock signal have a same clock cycle, and in one clock cycle, an effective pulse of the first clock signal and an effective pulse of the second clock signal are sequentially shifted;
wherein a shift register circuit of the plurality of shift register circuits comprises:
a first control module, wherein the first control module is electrically connected to a signal input terminal, a clock signal terminal and a first node separately and is configured to control a potential of the first node in response to an input signal of the signal input terminal and a clock signal of the clock signal terminal;
a first output module, wherein the first output module is electrically connected to the first node, a first level terminal and a signal output terminal separately and is configured to control a transmission path of a first level signal of the first level terminal to the signal output terminal in response to the potential of the first node;
a second control module, wherein the second control module is electrically connected to the first level terminal, a second level terminal, the first node and a second node separately and is configured to control a second level signal of the second level terminal to be transmitted to the second node when the first level signal of the first level terminal is transmitted to the signal output terminal and control the first level signal of the first level terminal to be transmitted to the second node when the first level signal of the first level terminal stops being transmitted to the signal output terminal; and
a second output module, wherein the second output module is electrically connected to the second node, the second level terminal and the signal output terminal separately and is configured to control a transmission path of the second level signal of the second level terminal to the signal output terminal in response to a potential of the second node; and
the circuit further comprising: a base substrate, a first semiconductor layer and a second semiconductor layer that are located on one side of the base substrate, a first conductive layer located on one side of the first semiconductor layer facing away from the base substrate, a first metal layer located between the first conductive layer and the second semiconductor layer;
wherein the first metal layer comprises a fixed signal transmission line and a first light-shielding structure that are disposed in a same layer, the first light-shielding structure overlaps the first active layer in a direction perpendicular to a plane on which the base substrate is located, and the fixed signal transmission line is configured to transmit the first level signal or the second level signal.

18. A display panel, comprising a shift register, wherein shift register comprises a plurality of shift register circuits arranged in a cascade manner, wherein among the plurality of shift register circuits, a signal output terminal of a previous-stage shift register circuit is electrically connected to a signal input terminal of a subsequent-stage shift register circuit, and a signal input terminal of a first-stage shift register circuit receives a start signal;

a clock signal of a clock signal terminal of an odd number-stage shift register circuit is denoted as a first clock signal, and a clock signal of a clock signal terminal of an even number-stage shift register circuit is denoted as a second clock signal; and the first clock signal and the second clock signal have a same clock cycle, and in one clock cycle, an effective pulse of the first clock signal and an effective pulse of the second clock signal are sequentially shifted;

wherein a shift register circuit of the plurality of shift register circuits comprises:

a first control module, wherein the first control module is electrically connected to a signal input terminal, a clock signal terminal and a first node separately and is configured to control a potential of the first node in response to an input signal of the signal input terminal and a clock signal of the clock signal terminal;

a first output module, wherein the first output module is electrically connected to the first node, a first level terminal and a signal output terminal separately and is configured to control a transmission path of a first level signal of the first level terminal to the signal output terminal in response to the potential of the first node;

a second control module, wherein the second control module is electrically connected to the first level terminal, a second level terminal, the first node and a second node separately and is configured to control a second level signal of the second level terminal to be transmitted to the second node when the first level signal of the first level terminal is transmitted to the signal output terminal and control the first level signal of the first level terminal to be transmitted to the second node when the first level signal of the first level terminal stops being transmitted to the signal output terminal; and a second output module, wherein the second output module is electrically connected to the second node, the second level terminal and the signal output terminal separately and is configured to control a transmission path of the second level signal of the second level terminal to the signal output terminal in response to a potential of the second node; and the circuit further comprising: a base substrate, a first semiconductor layer and a second semiconductor layer that are located on one side of the base substrate, a first conductive layer located on one side of the first semiconductor layer facing away from the base substrate, a first metal layer located between the first conductive layer and the second semiconductor layer;

wherein the first metal layer comprises a fixed signal transmission line and a first light-shielding structure that are disposed in a same layer, the first light-shielding structure overlaps the first active layer in a direction perpendicular to a plane on which the base substrate is located, and the fixed signal transmission line is configured to transmit the first level signal or the second level signal.

19. A display device, comprising the display panel according to claim 18.

* * * * *